United States Patent
Laufer

(10) Patent No.: US 8,693,946 B2
(45) Date of Patent: Apr. 8, 2014

(54) METHOD AND APPARATUS FOR COMPENSATION FOR WEATHER-BASED ATTENUATION IN A SATELLITE LINK

(75) Inventor: Shaul Laufer, Petach Tikva (IL)

(73) Assignee: Elbit Systems Land and C41—Tadiran Ltd., Natania (IL)

( * ) Notice: Subject to any disclaimer, the term of this patent is extended or adjusted under 35 U.S.C. 154(b) by 498 days.

(21) Appl. No.: 12/920,619

(22) PCT Filed: Apr. 22, 2009

(86) PCT No.: PCT/IL2009/000439
§ 371 (c)(1),
(2), (4) Date: Sep. 2, 2010

(87) PCT Pub. No.: WO2009/130700
PCT Pub. Date: Oct. 29, 2009

(65) Prior Publication Data
US 2011/0003543 A1 Jan. 6, 2011

Related U.S. Application Data

(60) Provisional application No. 61/071,330, filed on Apr. 22, 2008.

(51) Int. Cl.
*H04B 7/185* (2006.01)
(52) U.S. Cl.
USPC .......................... 455/12.1; 455/427; 370/316
(58) Field of Classification Search
USPC ............ 455/3.01–3.06, 427–430, 12.1–13.3; 370/316
See application file for complete search history.

(56) References Cited

U.S. PATENT DOCUMENTS

| | | | |
|---|---|---|---|
| 4,910,792 A | 3/1990 | Takahata et al. | |
| 4,941,199 A | 7/1990 | Saam | |
| 6,141,534 A | 10/2000 | Snell et al. | |
| 6,813,476 B1 | 11/2004 | Brooker | |
| 6,836,658 B1 | 12/2004 | Sharon et al. | |
| 7,174,179 B2 | 2/2007 | Krebs et al. | |
| 8,010,043 B2 * | 8/2011 | Miller | 455/12.1 |
| 8,055,267 B2 | 11/2011 | Cho | |

(Continued)

FOREIGN PATENT DOCUMENTS

| | | |
|---|---|---|
| EP | 1137198 | 9/2001 |
| EP | 1906578 | 4/2008 |

(Continued)

OTHER PUBLICATIONS

Maier et al., DiffServ-based Service-specific VCM in DVB-S2, Jul. 2007, Mobile and Wireless Communications Summit, 16th Edition.*

(Continued)

*Primary Examiner* — Raymond Dean

(57) ABSTRACT

A satellite broadcasting system for communication between a satellite hub and a range of ground stations in which a set having a predetermined number of modulation-codings (MODCODs) is available for data transmission from the satellite hub to the ground stations. Each MODCOD in use in the hub requires additional hub resources, and the system uses a MODCOD limiter for limiting the number of MODCODs in operation at a given time to a subset smaller than said predetermined number of MODCODS, thereby reducing overall resource usage.

19 Claims, 8 Drawing Sheets
(8 of 8 Drawing Sheet(s) Filed in Color)

(56) References Cited

U.S. PATENT DOCUMENTS

| | | | |
|---|---|---|---|
| 2003/0016634 | A1 | 1/2003 | Freedman et al. |
| 2003/0054816 | A1 | 3/2003 | Krebs et al. |
| 2004/0137840 | A1 | 7/2004 | La Chapelle et al. |
| 2004/0213259 | A1 | 10/2004 | Porter |
| 2005/0002375 | A1 | 1/2005 | Gokhale et al. |
| 2006/0064726 | A1 | 3/2006 | Loner |
| 2007/0097852 | A1 | 5/2007 | Thesling |
| 2008/0032733 | A1 | 2/2008 | Hays |
| 2008/0049659 | A1* | 2/2008 | Ram et al. ............... 370/316 |
| 2008/0274690 | A1 | 11/2008 | Laufer |
| 2012/0127921 | A1 | 5/2012 | Laufer |

FOREIGN PATENT DOCUMENTS

| | | |
|---|---|---|
| WO | WO 2005/027373 | 3/2005 |
| WO | WO 2008/129509 | 10/2008 |
| WO | WO 2009/130701 | 10/2009 |

OTHER PUBLICATIONS

Notice of Allowance Dated Jul. 20, 2011 From the US Patent and Trademark Office Re. U.S. Appl. No. 12/081,850.
Communication Pursuant to Article 94(3) EPC Dated Apr. 14, 2010 From the European Patent Office Re. Application No. 08737942.6.
International Preliminary Report on Patentability Dated Nov. 5, 2009 From the International Bureau of WIPO Re.: Application No. PCT/IB2008/051537.
International Search Report Dated Sep. 2, 2009 From the International Searching Authority Re.: Application No. PCT/IL2009/000439.
International Search Report Dated Aug. 4, 2009 From the International Searching Authority Re.: Application No. PCT/IL2009/000440.
International Search Report Dated Sep. 4, 2008 From the International Searching Authority Re.: Application No. PCT/IB2008/051537.
Response Dated Aug. 11, 2010 to Communication Pursuant to Article 94(3) EPC of Apr. 14, 2010 From the European Patent Office Re. Application No. 08737942.6.
Written Opinion Dated Sep. 2, 2009 From the International Searching Authority Re.: Application No. PCT/IL2009/000439.
Written Opinion Dated Aug. 4, 2009 From the International Searching Authority Re.: Application No. PCT/IL2009/000440.
Written Opinion Dated Sep. 4, 2008 From the International Searching Authority Re.: Application No. PCT/IB2008/051537.
Alberty et al. "Adaptive Coding and Modulation for the DVB-S2 Standard Interactive Applications: Capacity Assessment and Key System Issues", IEEE Wireless Communications, XP011191780, 14(4): 61-69, Aug. 1, 2007. p. 61-62.
ETSI "Digital Video Broadcasting (DVB). User Guidelines for the Second Generation System for Broadcasting, Interactive Services. News Gathering and Other Broadband Satellite Applications (DVB-S2); ETSI TR 102 376", ETSI Standards, Technical Report, XP014027139, BC(V1.1.1): 1-104, Feb. 1, 2005.
ETSI "Digital Video Broadcasting (DVB); Second Generation Framing Structure, Channel Coding and Modulation Systems for Broadcasting, Interactive Services, News Gathering and Other Broadband Satellite Applications", European Broadcasting Union, ETSI Standards, XP014034070, ETSI EN 302 307, BC(V1.1.2), 2006. § [5.5.2.2], [OH.4], Figs.H.5, H.7, H.8.
Maral et al. "Satelllite Communications Systems", STI, 1986.
Morello et al. "DVB-S2: The Second Generation Standard for Satellite Broad-Band Services", Proceedings of the IEEE, 94(1): 210-227, Jan. 2006.
Saam et al. "Uplink Power Control Technique for VSAT Networks", Energy and Information Technologies in the Southeast, Proceedings of the Southeast Conference, Southeastcon '89, IEEE, XP00007682, 1(of 3): 96-100, Apr. 9, 1989.
Communication Pursuant to Article 94(3) EPC Dated Jun. 4, 2012 From the European Patent Office Re. Application No. 09734884.1.
Communication Pursuant to Article 94(3) EPC Dated Jun. 4, 2012 From the European Patent Office Re. Application No. 09734930.2.
Communication Pursuant to Article 94(3) EPC Dated Nov. 23, 2011 From the European Patent Office Re. Application No. 08737942.6.
Official Action Dated Mar. 14, 2011 From the US Patent and Trademark Office Re. U.S. Appl. No. 12/081,850.
Response Dated Feb. 13, 2011 to International Search Report and the Written Opinion of Aug. 4, 2009 From the International Searching Authority Re.: Application No. PCT/IL2009/000440.
Official Action Dated Jul. 31, 2012 From the US Patent and Trademark Office Re. U.S. Appl. No. 12/920,616.
Response Dated Jun. 14, 2011 to Official Action of Mar. 14, 2011 From the US Patent and Trademark Office Re. U.S. Appl. No. 12/081,850.
Notice of Allowance Dated Sep. 15, 2011 From the US Patent and Trademark Office Re. U.S. Appl. No. 12/081,850.
Official Action Dated Mar. 8, 2013 From the US Patent and Trademark Office Re. U.S. Appl. No. 12/920,616.
Maurutschek et al. "DiffServ-Based Service-Specific VCM in DVB-S2", 16th IST Mobile and Wireless Communications Summit, 2007 IEEE, XP031132465, p. 1-5, Jul. 1, 2007. § [0III], [00IV], Figs.1, 3, 4, Tables II, V.
Requisition by Examiner Dated Jun. 4, 2013 From the Canadian Intellectual Property Office Re. Application No. 2,684,854.
Translation of Notice of the Reason for Rejection Dated May 8, 2013 From the Korean Intellectual Property Office Re. Application No. 10-2009-7024239.
International Preliminary Report on Patentability Dated Nov. 4, 2010 From the International Bureau of WIPO Re. Application No. PCT/IL2009/000440.
Communication Pursuant to Article 94(3) EPC Dated Oct. 30, 2013 From the European Patent Office Re. Application No. 08737942.6.
Notice of Allowance Dated Oct. 4, 2013 From the US Patent and Trademark Office Re. U.S. Appl. No. 12/920,616.
Office Action Dated Jul. 22, 2013 From the Israel Patent Office Re. Application No. 208816 and Its Translation Into English.
Translation of Notice of the Reason for Rejection Dated Sep. 5, 2013 From the Korean Intellectual Property Office Re. Application No. 10-2009-7024239.
Office Action Dated Dec. 4, 2013 From the Israel Patent Office Re. Application No. 208817 and Its Translation Into English.

* cited by examiner

METHOD AND APPARATUS FOR COMPENSATION FOR WEATHER-BASED ATTENUATION IN A SATELLITE LINK

RELATED APPLICATIONS

This Application is a National Phase of PCT Patent Application No. PCT/IL2009/000439 having International filing date of Apr. 22, 2009, which claims the benefit of U.S. Provisional Patent Application No. 61/071,330 filed on Apr. 22, 2008. The contents of the above Applications are all incorporated herein by reference.

FIELD AND BACKGROUND OF THE INVENTION

The present invention relates to a system for compensation for weather-based attenuation in a satellite link and, more particularly, but not exclusively to such compensation wherein a range of modulation levels can be selected. The present methods can be used in either one direction, that is forward or return links, or in both directions (forward and return links).

Weather can cause attenuation to the signal on a satellite communication link. Furthermore the ground to satellite leg may experience different weather conditions from the satellite to ground leg. Furthermore, in a broadcast system, different satellite to ground legs may experience different weather conditions, so that the overall attenuation in the link may not only change rapidly but may differ between different receiving stations at the same instant.

A number of solutions have been used in the past. One popular solution involves designing the satellite communication system at the outset for the worst case weather conditions. Such a solution is particularly wasteful of power although it rarely fails. Another solution involves using climatology to estimate weather parameters of concern, and then setting the transmission power for the estimated conditions. Further solutions use empirical models based on climatological data and long baseline observations of signal strength to model RF attenuation and compensate accordingly.

A recent proposal involves operating the link based on expected daily weather conditions for the specific geographical region in which the link operates. However even in this case transmission power is wasted since the system operates on the basis of the worst case within the time and geographical frame of the estimate.

It is known to provide automatic uplink power control (AUPC), that is, adjusting the output power on the uplink, with the general aim of maintaining a constant signal to noise ratio at the remote end. This is however inexact as the Control over the downlink is indirect.

Adaptive coding and modulation (ACM) is known to keep the SNR of the channel constant in the face of changing noise levels. The modulation pattern is changed between a high capacity modulation at low noise and a low capacity but highly robust modulation when the noise increases.

The following documents are representative of the state of the art:

Thomas J. Saam, "Uplink Power Control Technique for VSAT Networks", in *Proceedings of Souteastcon* 89, pp. 96-101, April 89.

Thomas J. Saam, "Uplink power control mechanism for maintaining constant output power from satellite transponder", U.S. Pat. No. 4,941,199, Filed Apr. 6, 1989.

Lawrence W. Krebs et al., "Methods and Apparatus For Mitigating Rain Fading Over Satcom Links Via Information Throughput Adaptation, U.S. Pat. No. 7,174,179, Filed Feb. 6, 2007.

ETSI EN 302 307 V1.1.1 (2004-01): "Digital Video Broadcasting (DVB) Second generation framing structure, channel coding and modulation systems for Broadcasting, Interactive Services, News Gathering and other broadband satellite applications".

Alberto Morello, Vittoria Mignone, "DVB-S2: The Second Generation Standard for Satellite Broad-band Services", *Proceedings of the IEEE*, vol. 94, no. 1, pp. 210-227, January 2006

G. Maral, M. Bousquet, *Satellite Communications Systems*, Third Edition, John Wiley & Sons, Ltd., 1999.

SUMMARY OF THE INVENTION

The changing levels of attenuation in the system can be compensated for by changing the modulation level, the MOD COD in use. However over the system as a whole, with links spread over a geographical area it is desirable to limit the overall number of MOD CODs in use.

According to a first aspect of the present invention there is provided a satellite broadcasting system for communication between a satellite hub and a range of ground stations in which a set having a predetermined number of MODCODS is available for data transmission from the satellite hub to the ground stations, each MODCOD utilizing resources, the system comprising a MODCOD limiter for limiting the number of MODCODs in operation at a given time to a subset smaller than the predetermined number of MODCODS, thereby reducing overall use of resources.

In an embodiment, the MODCODS range from a minimal configuration to a maximal configuration and wherein the MODCOD limiter is configured to retain a MODCOD having a minimal configuration.

An embodiment may comprise a utilization unit associated with the MODCOD limiter to direct the MODCOD limiter to retain MODCODS with a higher utilization and discard MODCODS with a lower utilization.

In an embodiment, the MODCOD limiter is configured to modify utilization thresholds of respectively retained MODCODS.

In an embodiment, the ground stations are divided into regions, the MODCOD limiter being configured to retain and discard MODCODS per region.

An embodiment may comprise a utilization unit associated with the MODCOD limiter to direct the MODCOD limiter to retain MODCODS with a higher utilization and discard MODCODS with a lower utilization, wherein the utilizations are per region.

In an embodiment, the MODCODS range between a minimal configuration and a maximal configuration, the MODCOD limiter being configured to provide each region with the minimal configuration MODCOD irrespective of utilization and at least two other MODCODS based on respectively higher utilization.

An embodiment may comprise determining overall utilization levels of MODCODs over all regions and replacing MODCODS of low overall utilization with a nearest lower configuration MODCOD of higher utilization.

According to a second aspect of the present invention there is provided a satellite broadcasting method for communication between a satellite hub and a range of ground stations in which a set having a predetermined number of MODCODS is available for data transmission from the satellite hub to the ground stations, each MODCOD requiring resources, the method comprising limiting the number of MODCODs in operation at a given time to a subset smaller than the predetermined number of MODCODS, thereby reducing overall resource usage.

In an embodiment, the MODCODS range from a minimal configuration to a maximal configuration, the method comprising retaining a MODCOD having a minimal configuration.

An embodiment may involve identifying respective utilization levels of MODCODS and retaining MODCODS with a higher utilization and discarding MODCODS with a lower utilization.

In an embodiment, the ground stations are divided into regions, the method comprising discarding MODCODS per region.

An embodiment may involve directing the MODCOD limiter to retain MODCODS with a higher utilization and discard MODCODS with a lower utilization, wherein the utilizations are per region.

An embodiment may involve providing each region with the minimal configuration MODCOD irrespective of utilization and at least two other MODCODS based on respectively higher utilization.

An embodiment may involve providing an interactive television channel.

In an embodiment, the MODCODS range between a minimal configuration and a maximal configuration, and wherein the ground stations are divided into regions, the method comprising:

assigning a first MODCOD of minimal configuration to all regions;

assigning to each region a second MODCOD corresponding to ideal conditions for the region; and assigning to each region a further MODCOD with a configuration lying between those of the first and the second MODCODs.

An embodiment may involve determining overall utilization levels of MODCODs over all regions and replacing MODCODS of low overall utilization with a nearest lower configuration MODCOD of higher utilization.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. The description taken with the drawings makes apparent to those skilled in the art how the several forms of the invention may be embodied in practice.

In the drawings:

FIG. 1 is a simplified diagram illustrating a satellite link dynamically adjusted by AUPC & ACM mechanisms to overcome changing weather-based attenuation according to a first embodiment of the present invention.

FIG. 2 is a simplified diagram showing theoretical measuring of separate uplinks and downlinks for differential control of the links, according to a preferred embodiment of the present invention.

FIG. 3 is a simplified diagram showing the control of different parameters for the uplink and for the downlink according to a preferred embodiment of the present invention.

FIG. 4 is a simplified diagram showing an implementation of the system of FIG. 3, according to a preferred embodiment of the present invention.

FIG. 5 is a simplified flow chart illustrating a process of changing control parameters for each link in a respective stage following polling, according to a preferred embodiment of the present invention.

FIG. 6 is a simplified graph showing resource consumption, that is both bandwidth and power, for different MODCODS.

FIG. 7 is a simplified flow chart showing different MODCODS with different levels of availability.

FIG. 8 is a graph showing MODCOD distribution in percentages.

FIG. 9 is a schematic illustration showing different MODCODS with different percentage uses for a system.

DESCRIPTION OF THE PREFERRED EMBODIMENTS

Figure 1:
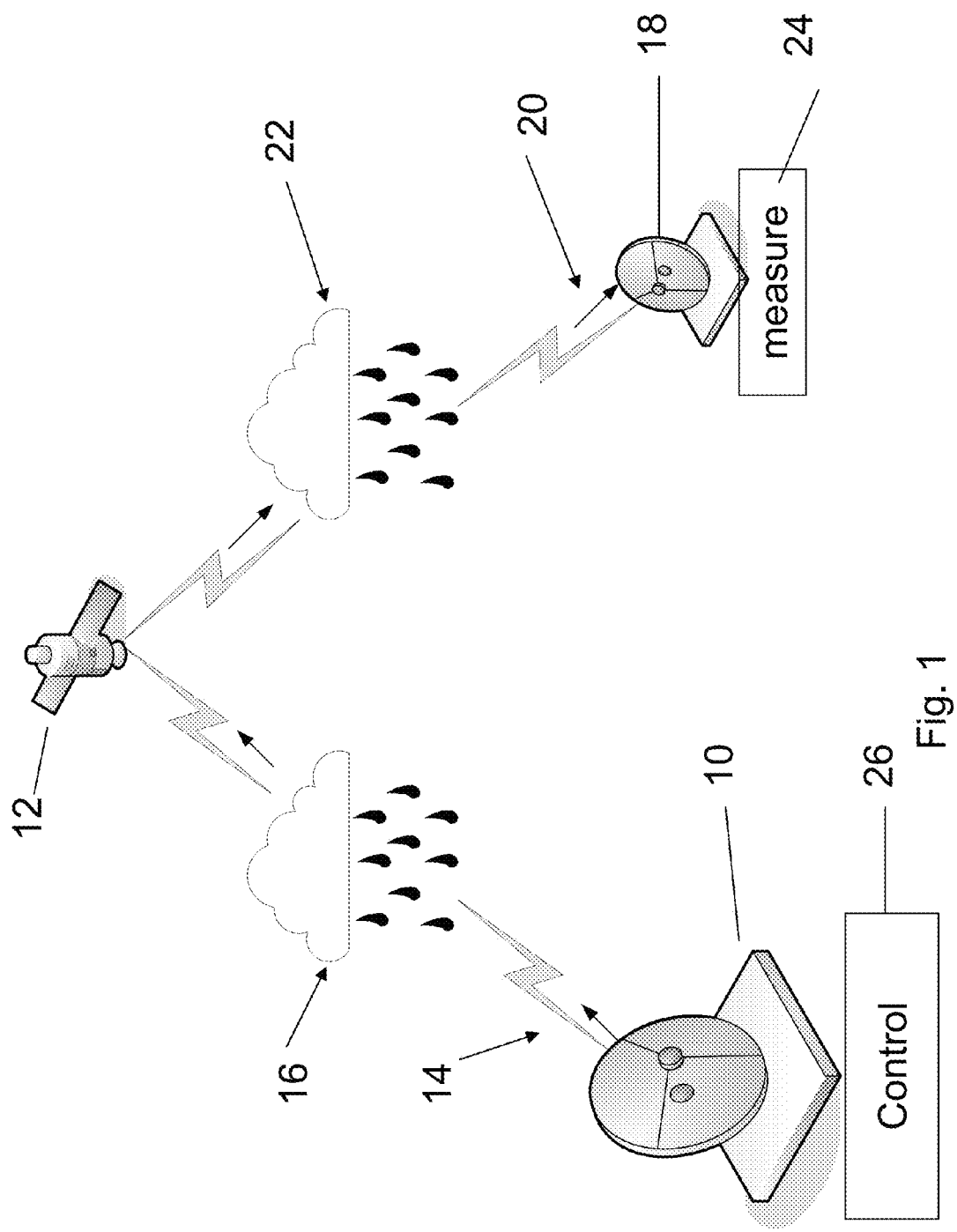

The present embodiments comprise an apparatus and a method which uses measured weather conditions or weather consequential attenuation on the link to modify the link parameters.

In an embodiment claimed in applicant's copending application, the weather-related attenuation on the uplink, meaning the link from the originating ground station to the satellite, is measured, or more accurately estimated from a measure of the overall attenuation, and the uplink power is controlled accordingly to achieve a substantially constant received uplink power. In the same embodiment the weather related attenuation on the downlink, meaning the link from the satellite to the receiving station, is measured, or more accurately estimated from the same measurement as before, and the downlink modulation and coding parameters are modified to compensate for the attenuation and provide a substantially constant receive quality at the receiving station.

The presently claimed embodiments modify the transmission on the link between the hub and the home, not by modifying the transmission power since this is often not possible, but rather by modifying the MODCOD, that is to say modifying the modulation so that at low attenuation (good weather) high level modulation is used to obtain a high bandwidth channel. At greater attenuations lower level modulation is used to compensate for the greater attenuation and still provide correct reception, but at the cost of bandwidth. The hub or part of the hub involved in the particular transmission however does not operate using endless MODCODS for all of its links. Rather, according to the present embodiments the total number of MODCODs in use at any given time is limited, and the limitation follows a scheme which looks for the best efficiency from the MODCODs chosen.

More specifically, the present embodiments involve enhancing a VSAT star network based on a single carrier time multiplexed outbound channel (e.g. DVB-S2), with combined AUPC (Automatic Uplink Power Control) and ACM (Adaptive Coding and Modulation) capabilities in order to optimize satellite resources utilization. The AUPC is designed to maintain constant satellite transmitted power in all weather conditions by dynamically adapting the transmitted carrier level to the uplink rain attenuation. The ACM capability is designed to maintain constant received signal quality at each terminal by dynamically adapting the modulation and coding assigned to the packets transmitted to each terminal to the downlink rain degradation affecting this terminal.

The present embodiments disclose a satellite broadcasting system for communication between a satellite hub and a range of ground stations in which a set having a predetermined number of MODCODS is available for providing data transmission from the satellite hub to the ground stations. The set of MODCODS or modulation and encoding combinations is generally set by the satellite broadcast standard being used, and the broadcaster has the freedom to choose which MODCODS to select. The MODCODS may be selected dynamically depending on the conditions and a favored way to deal with deteriorating weather conditions is to use a slower but more robust MODCOD so as to send less data but ensure that it can be read at the destination. In general a single satellite broadcasts data over a wide region, where different weather conditions may pertain, and thus different MODCODS may be in force simultaneously over the regions. Any given data is thus queued, encoded and broadcast for the particular MODCOD in force at its region. If too many MODCODS are in use at the same time then traffic related to low utilization MODCODs suffer from large and varying delay. Alternatively, if the allowed maximum delay is limited, the efficiency degrades as blocks assigned to low utilization MODCODS may be transmitted partially empty at a higher pace than necessary.

The present embodiments thus provide a MODCOD limiter, part of control 30 in FIG. 2 discussed below, for limiting the number of MODCODs in operation at a given time.

The MODCODS may range from a minimal configuration, meaning minimal data rate with maximal error correction for really bad conditions, to a maximal configuration with high data rate and little error correction for ideal conditions. The MODCOD limiter may retain the minimal configuration MODCOD for all regions and discard selected higher configuration MODCODS.

It is stressed that the minimal configuration may vary in the circumstances. The minimal configuration for a particular link may be a different MODCOD from that of a different link and neither of them need be the lowest configuration provided by the standard.

A utilization unit may direct the MODCOD limiter to retain MODCODS with a higher utilization and discard MODCODS with a lower utilization. Discarding per utilization is on the basis that if a particular MODCOD is utilized say only 1% of the time, then discarding it will have little effect on performance.

In an embodiment, MODCODs are retained and discarded per region, since different regions may be undergoing different conditions. Nevertheless even if retention and discarding is per region, it may be desirable to control the number of MODCODS overall in the system.

In an embodiment the MODCOD limiter may provide each region with the minimal configuration MODCOD irrespective of utilization and say two or three other MODCODS based on respectively high utilization.

One or more of the channels being broadcast may be an interactive television channel.

The following abbreviations are used throughout this specification:
AUPC—Automatic Uplink Power Control
ACM—Adaptive Coding and Modulation
CNR—Carrier to Noise Ratio
SIGL—Signal Level
NBW—Noise Bandwidth
HPA—High Power Amplifier
LNB—Low Noise Block
SCPC—Single Channel Per Carrier
PEB—Power Equivalent Bandwidth The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1 which illustrates a controlled satellite link, according to a first preferred embodiment of the present invention. A hub 10 transmits a signal to a satellite 12 over an uplink 14. The uplink encounters rain and clouds 16 which cause weather-related attenuation of the signal. It will be appreciated that weather conditions can change rapidly so that the overall attenuation of the uplink is itself liable to change rapidly.

The satellite 12 relays the signal it has received on the uplink to one or more ground-based receiving stations 18 via a downlink 20. The downlink 20 is also liable to weather based attenuation, which may be brought about by rain and clouds 22. It will be appreciated that the dynamic variation in attenuation on the downlink tends to add to any attenuation on the uplink and also tends to vary independently. It is noted that the uplink attenuation is present in all received signals since there is only one uplink in the present embodiment, but the downlink attenuation varies.

Thus in a first embodiment of the present invention a reference unit 24 is inserted at a receiving station for measuring signal attenuation over the link. The measured attenuation is transmitted back to the hub 10 where a control unit 26, controls a link transmission parameter to dynamically compensate for changes in the measured signal attenuation. Thus as the signal attenuation increases the reference unit 24 informs the control unit, which then either strengthens the signal or makes the coding or modulation or both more robust so that the received signal remains readable.

In FIG. 1, only a single ground-based receiving station is shown, although it will be appreciated that most satellites relay to multiple ground stations. In fact the satellite link may be a broadcast link, and there may therefore be numerous ground-based receiving stations spread over a substantial region. In any event different weather conditions may apply to different receiving stations.

Figure 2:
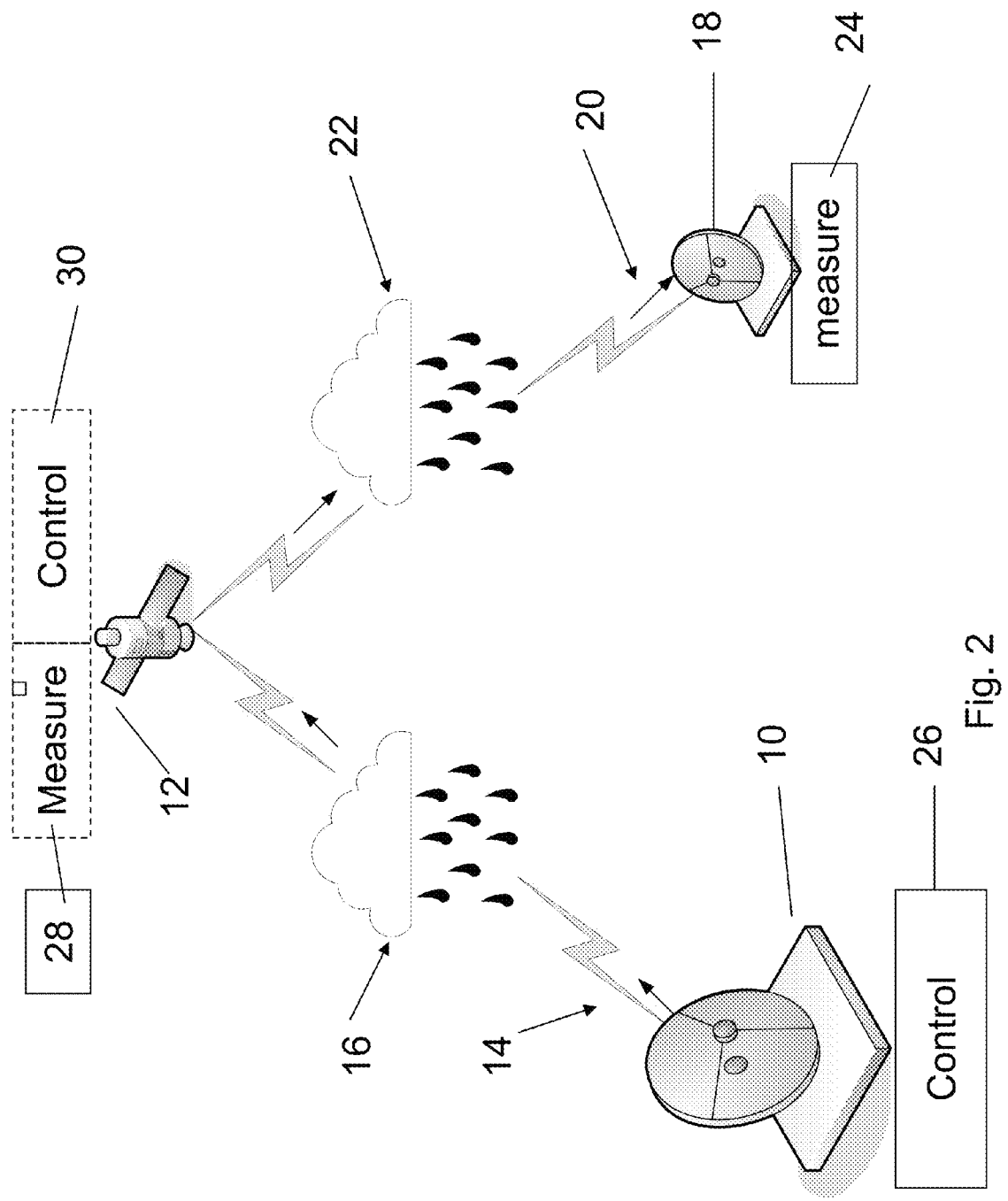

Reference is now made to FIG. 2, which illustrates a further embodiment of the present invention in which the link of FIG. 1 is modified to provide separate control over the uplink and the different down links. Parts shown in hashed lines may be regarded as theoretical since the ability to make modifications to the satellite 12 is limited and practical implementations are explained below. Specifically items shown in dashed lines indicate features which one would like to include at the satellite, but in practice this is not possible and a system of indirect measurement is discussed below. Separate reference units are provided for the uplink and all or some of the different down links. Reference unit 28 is theoretically provided at the satellite for independent measuring of attenuation at the uplink, and control unit 26 independently compensates for uplink attenuation. Reference unit 24 measures attenuation on the downlink and control unit 30 at the satellite independently compensates for changes in the measured attenuation at the downlink. In practice reference unit 24 is all that is available, so that uplink attenuation is derived from the measurements at reference unit 24, as will be described in greater detail hereinbelow.

It is noted that in satellite communication there is a beacon transmitted at a different frequency with constant power towards the earth. Based on received beacon signal level the uplink attenuation can be estimated after taking into account the frequency difference between the beacon and the signal transmission.

In one embodiment a reference unit is provided at each receiving station and the signal to each ground-based receiving station is independently controlled. However, in the case of television or like broadcasting there may be hundreds of thousands or even millions of receiving stations so, in an alternative embodiment, it is possible to aggregate the various downlinks on a regional basis. That is all downlinks in a certain geographical area may be compensated together based on local weather as measured at one or two of the receiving stations in the region.

Parameters used in transmission channels are numerous and many such parameters can be adjusted to overcome attenuation. One such parameter is transmitted power. In case of severe attenuation the transmission power can be increased. Increased transmission power is generally only available from the hub 10 however. The satellite has only limited power resources and thus increases in transmission power for the down link are not really practical. Other parameters that can be modified are coding and modulation parameters. The complexity or robustness of the coding and/or modulation of the signal can be adjusted to maintain received signal quality.

Figure 3:
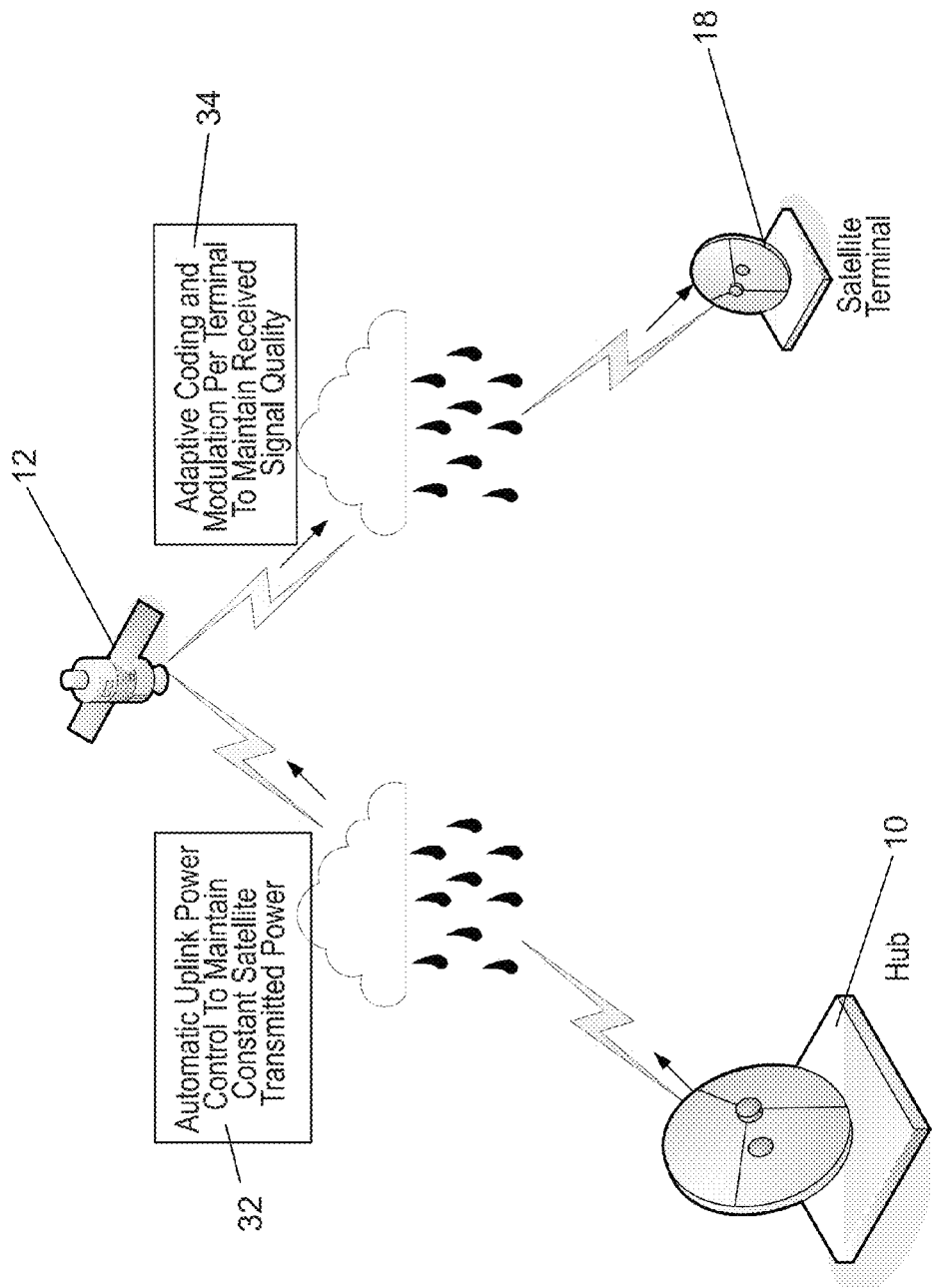

Reference is now made to FIG. 3, which is a simplified diagram showing an uplink 32 in which the controlled transmission parameter is transmission power. A downlink 34 is shown in which adaptive coding and modulation are provided to ensure the quality of the received signal is maintained. It will be appreciated that compensation for attenuation by modifying the coding and modulation parameters to make the coding and modulation more robust leads to a reduction in the signal rate. Thus picture quality may have to be degraded, and say high definition television HDTV quality may be lost over the duration of a bad weather episode. However as long as the degradation is restricted to the bad weather episode due to dynamic measuring of the signal then the disruption to the customer is minimized. Alternatively, if the satellite beam covers a large territory with many regions of independent climatic conditions, the throughput of a site can be maintained even in varying rain conditions and accordingly varying modulation and coding parameters. The network design may take into account a distribution of modulation and coding parameters according to climate statistics over the region. When a specific site uses more robust parameters it does not have to reduce throughput but it can consume a larger fraction of the total carrier, while other sites may use less robust parameters at the same time and therefore consume a smaller fraction of the carrier. For a large network the actual aggregated throughput may be similar to the calculated average throughput with very small variance.

Figure 4:
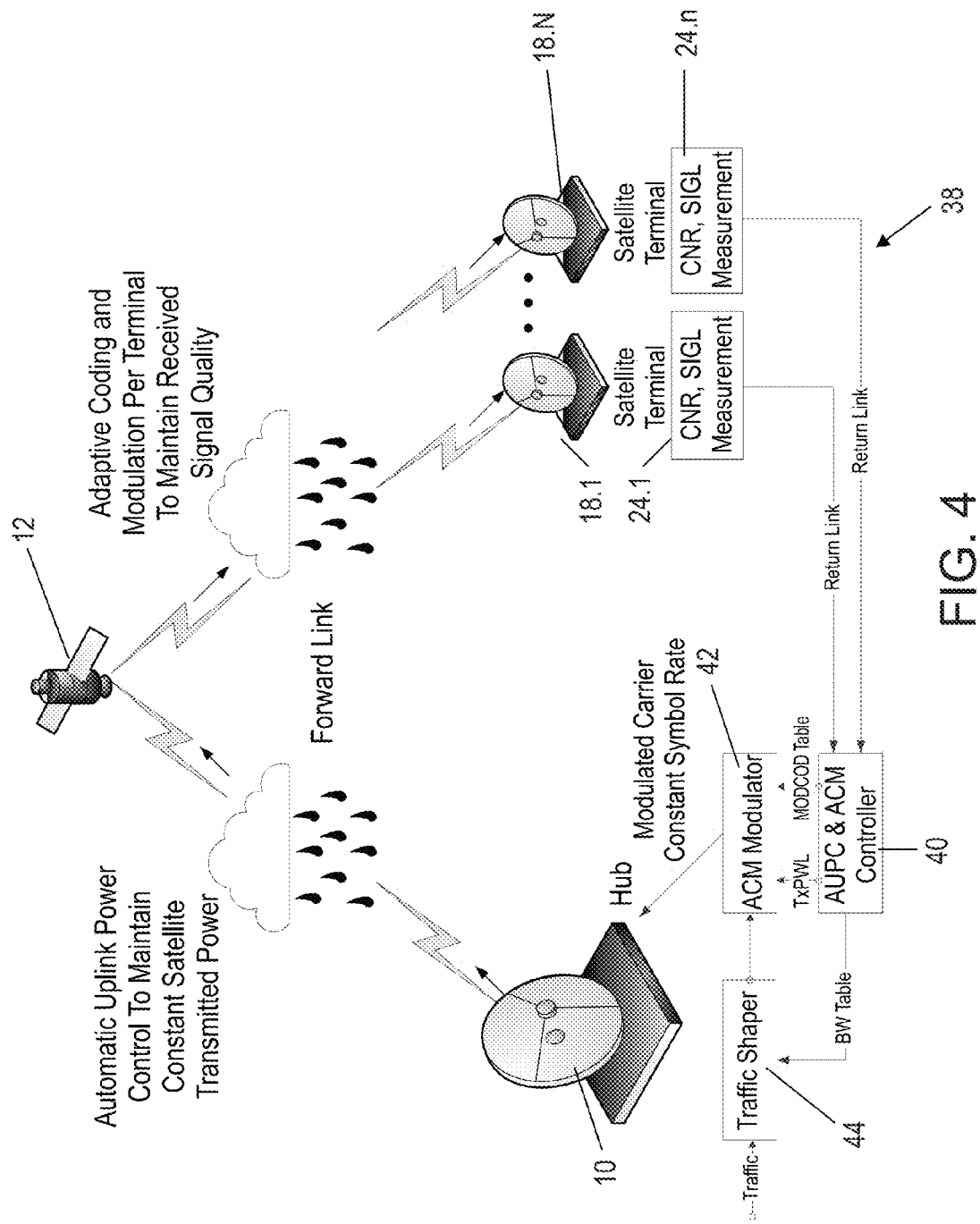

Reference is now made to FIG. 4, which shows in greater detail how the invention may be applied in practice to a broadcast type satellite link with a single hub and multiple receiving stations in which modifications to the satellite are not possible. In FIG. 4 hub 10 broadcasts to satellite 12 which relays the signal to ground-based receiving stations 18.1 . . . 18.*n*. Each ground-based receiving station has different weather conditions. The SNR at each receiving station is measured by a measurement unit 24.1 . . . 24.*n*. The measurements are then fed via return links, which are typically satellite links or ground links 38, say ADSL over a telephone network, to AUPC and ACM controller 40. The AUPC and ACM controller then interacts with ACM modulator 42 and both the controller 40 and modulator 42 interact with traffic shaper 44 to modify the signal that is sent over the link.

Two independent measurements of SNR and received signal level are performed by a reference ground station or alternatively measurements of forward link and return link SNR of a reference ground station. The two measurements are considered together and enable estimations of the uplink and the downlink attenuation separately. Thus the inability to measure at the satellite is compensated for. The measurements from different ground stations are also considered together. Uplink attenuation can be used to average the uplink result and downlink attenuation is attributed to the different downlinks.

The present embodiments provide for coordination between the mechanisms that compensate for uplink and downlink variations in the attenuation. Compensation for the uplink by changing the transmitted power affects the measurements performed by the ground station and the selection of modulation and coding parameters. Thus lack of coordination may result in the repeating of transmissions of requests to change the current selection from any of the ground stations before and after uplink power compensation, so that the ground stations ask for a change that has already been provided. Furthermore the present embodiments require time for achieving stable selection of parameters. The object of the coordination is that different parts of the networks are not working against each other and therefore preventing stability from being attained. Failure to coordinate may lead to a need for increased margins, namely wasting satellite resources.

In summary there is provided a method of controlling a satellite link comprising: measuring attenuation over the link, and dynamically adjusting at least one of the transmission parameters to compensate for changes in the measured attenuation. In an embodiment attenuation may treated per leg, that is per uplink and per downlink, but in such a case, because the satellite itself cannot be modified, the effects at each separate link have to be derived.

The presently derived approach may also be used for other ACM capable Outbound signals and also for point-to-point SCPC (Single Channel Per Carrier) satellite links. The embodiments use communication channel measurements, to allow location and beam independent, real time operation, of the combined AUPC and ACM processes. The channel measurements are used for estimating dependent or independent uplink and downlink rain attenuation and degradation. These estimations are then used for making the decisions on the compensations required in the uplink and in the downlink.

As will be explained in greater detail below, several principle implementations are discussed. A first implementation, hereinafter Case I, involves a reference terminal installed at the teleport. A second implementation, Case II involves reference terminals anywhere, namely either at the teleport or other locations in the same beam, or at other locations in a different beam. A third implementation, Case III involves a return link via the satellite. This contrasts with FIG. 4 above, where the return link was terrestrial. In case III the return link provides measurements that are used together with forward link measurements for estimating the uplink and downlink attenuation. In case II the return link can be either via satellite or terrestrial and is used for forwarding the measurements made by the ground station relating to the link from the ground station to the hub.

The present embodiments may be used for AUPC only, for example where ACM is not supported by terminals or not activated. Alternatively the embodiments may be used for ACM only, for example where a beacon receiver is used for uplink power control, or uplink is transmitted via C band beam, or the transponder operates at ALC—Automatic Level Control mode. As a further alternative the embodiments may involve combined AUPC and ACM operating together to achieve optimal utilization of transponder resources.

The present embodiments provide a controller that compensates in real time for independent atmospheric and other variations in both uplink and downlink of a satellite communications link. Such a link may be either the multiplexed Outbound carrier of a star VSAT network, or a point-to-point SCPC satellite link. The compensation is performed for the uplink by controlling the transmitted power in order to maintain constant satellite transmitted power at all weather conditions. For the downlink the compensation is based on assigning appropriate modulation constellation and code rate which can provide the maximal throughput for the actual weather conditions. The controller algorithm uses channel measurements performed by the receiving stations that are sent back to the controller. The receiving stations are standard stations that provide service and can be anywhere, under any beam of the satellite. Measurements performed by several or all stations can be used for improving the channel estimations. The uplink control is designed to maintain constant satellite transmitted power at all weather conditions by adapting the transmitted carrier level to the uplink rain attenuation. The adaptation of coding and modulation is designed to maintain constant received signal quality at each terminal according to the downlink rain degradation affecting this terminal. The adjustment for each terminal is implemented by the modulator by transmitting, using time-division multiplexing, a sequence of frames, where the coding and modulation format may change frame-by-frame. Each frame may carry traffic to terminals that expect the coding and modulation levels assigned to that frame.

The uplink and down link adaptation are based on the same channel measurements. The present embodiments may separate the effects of the uplink and down link as reflected from the channel measurements performed by the receiving stations. As the uplink control influences the downlink performance, the present embodiments perform combined control of uplink and downlink by deducting the effect of the uplink control from the current channel measurements in order to allow for computing the downlink control stage using the same current measurements. Such a technique reduces the control cycle time and the number of modulation and coding corrections as there is no need to wait for the next updated measurements that would be affected by the uplink update for correctly updating the downlink modulation and coding.

The above approach avoids repeating transmissions from all ground stations requesting to change selection of modulation and coding before and after uplink power modification, and saves time for achieving stable selection. Consequently smaller margins are required and satellite resources are saved.

The channel estimations produced by the above process, namely uplink and down link attenuations can be used, after appropriate correction according to up/down frequency ratios, to additionally control the return links of a star VSAT network (or the return link of the SCPC link). The controller instructs each VSAT to increase/decrease its power level in order to compensate for changes in the estimates of the Return link uplink attenuation. If the VSAT EIRP is already fully exploited and the uplink rain-linked fading is not fully compensated, then compensation may be achieved by a reduction in transmission rate and/or modulation and coding, and the spare power may then be assigned to other more powerful VSATs, so that the total power consumed from any transponder is maintained at a constant level. The controller may also instruct a modification of the transmission rate, modulation and coding in order to compensate the changes in downlink rain attenuation. Compensation may be based on either the already estimated downlink rain degradation or the measured return link signal to noise ratio. Compensation should be after deduction of the uplink power compensation.

Figure 6:
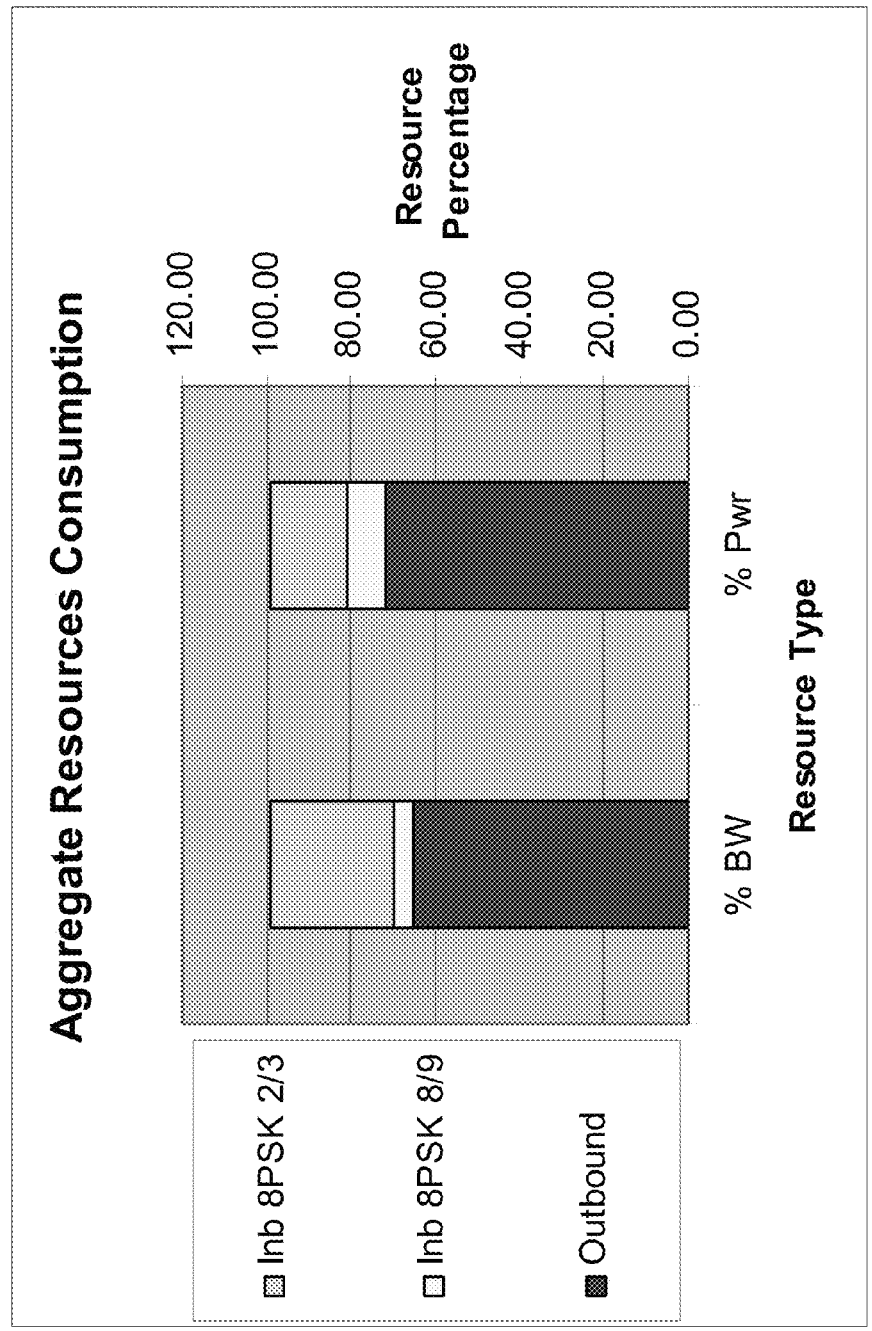

Another consideration that may be taken into account by the controller is to achieve balanced resource utilization, namely appropriate selection of modulation codes or MOD-CODs for the return links. That is to say the controller may wish to balance the consumed power and bandwidth resources from a transponder which contains the return links with or without the Outbound link. Balancing is based on having a selection of a few MODCODs for the return links where the higher MODCODs consume more power equivalent bandwidth (PEB) than bandwidth, while the lower MOD-CODs consume more bandwidth than PEB. In the case that the Outbound link is in the same transponder it might be more efficient to make the Outbound unbalanced, to allow a higher Outbound MODCOD, and to balance it with appropriate selection of MODCODs for the return links residing in the same transponder. In the case of a band (or full transponder) assigned only for return links the controller may assign MODCODs according to traffic requirements, weather conditions, satellite coverage, and balancing requirements so that overall balancing may be achieved. Such operation of the controller enables to use all available resources in an efficient way. FIG. 6 is a graph showing the result of such balancing. The controller takes into account that generally the return links are sensitive mainly to uplink fading and not to downlink fading as the CNR in the downlink is generally much larger that in the uplink due to the use of a large teleport antenna. Therefore in the design of the balanced operation the assignment of MODCODs is mainly according to overall network traffic in the return links that may be delivered with specific MODCOD. The controller uses ACM and TRC (Transmission Rate Control) to compensate for the limitation of the remote terminal in terms of EIRP for severe rain conditions at the terminal site and for increasing the transmission rate beyond the committed rate to best effort based rates. Such a concept not only optimizes the satellite transponder resources utilization but also allows minimizing of the required EIRP of the terminals and a reduction in their cost.

The concept is applicable to any form of modulation that the return channel may use. In particular it is applicable for both FDMA and TDMA type return channels, where for TDMA the terminals have to be moved among carriers with different MODCODs or instantaneous transmission rate when the controller decides to change their MODCOD or their instantaneous transmission rate. The controller algorithm is as follows for three active MODCODs, but can be extended to any number of MODCODs:

1. Design in advance the ratios of overall network Inbound traffic that may use High MODCOD, Medium MODCOD and Low MODCOD respectively to achieve balanced resource consumption. Balance should be in terms of bandwidth and PEB in the frequency band assigned to all the network carriers within given a transponder, and may include the presence of an unbalanced Outbound carrier in the same transponder, or or may not.
2. Assign the High MODCOD to all terminals with low data rates and good climate conditions until the maximum aggregated traffic allowed to work in such MODCOD is reached, according to the designed balance.
3. Assign Low MODCOD to the rest of the terminals. These are terminals where the CNR is such that they cannot use the high MODCOD and thus could not otherwise deliver the actual required transmission rate in their climate conditions. Add also those terminals which can survive at this time with a higher MODCOD, but are not far from exhausting their EIRP, until the designed aggregated traffic for this MODCOD is reached.
4. Assign Medium MODCOD to the rest of the terminals.
5. When traffic requirements or climate conditions change the controller may change the assignments accordingly to maintain the designed ratio for balanced resources consumption, while taking into account the terminal limitations in terms of EIRP.

We define the following parameters:
BW=Bandwidth in Hz
α=Roll Off Factor
COD=Code Rate of the FEC (Forward Error Correcting) Code
MOD=$\log_2$( ) of modulation constellation size (e.g. 2 for QPSK, 3 for 8PSK)
$R_s$=Symbol Rate in sps (symbols per second)
$R_b$=Bit Rate in bps (bits per second), $R_b=R_s \cdot (MOD \cdot COD)$
C=Carrier Power in Watts [(C) in dBW], after the receiver matched filter
N=Noise Power in Watts [(N) in dBW], after the receiver matched filter
NBW=Noise Bandwidth in Hz
$N_o$=Noise Spectral Density in Watts/Hz, i.e. Noise Power per 1 Hz, $N_o$=N/NBW
$E_s$=Energy per symbol in Joules, $E_s=C/R_s$
$E_b$=Energy per bit in Joules, $E_b=C/R_b$
CNR=Carrier to Noise Ratio [(CNR) in dB], CNR=C/N
SIGL=Received Signal Level in Watts [(SIGL) in dBW]
(G/T) (dB/K) is the figure of merit of a receiving terminal
$L_{fs,dn}$(dB) is the free space loss between the satellite and the reference VSAT at frequency $f_{dn}$ (Hz)
$A_{dn}$(dB) is the downlink rain attenuation
$A_{up}$(dB) is the uplink rain attenuation
$M_{CS}$(dB) required clear sky margin
$(CNR)_{HMC}$(dB) the lower CNR threshold for the highest MODCOD (see Table 3)
$T_{antenna}$ (K) Antenna noise temperature
$T_{LNB}$ (K) LNB noise temperature
HMC highest MODCOD allowed for clear sky conditions
AUPC Case I We describe the algorithm for maintaining constant satellite transmitted power $EIRP_{sat}$ at all weather conditions by adapting the transmitted Outbound carrier level Tx_PWL to the uplink rain attenuation $A_{up}$, where a reference VSAT, with antenna diameter $D_{ref}$ is installed at the teleport, and the same satellite beam covers both teleport and all other VSATs in the network, so that the carrier transmitted from the teleport may be received at the teleport. In Case I the reference terminal is installed at the uplink teleport, thus having dependent uplink and downlink rain attenuation. CNR measurements and G/T corrections are used as proposed by Thomas J. Saam, "Uplink Power Control Technique for VSAT Networks", in *Proceedings of Souteastcon* 89, pp. 96-101, April 89, and Thomas J. Saam, "Uplink power control mechanism for maintaining constant output power from satellite transponder", U.S. Pat. No. 4,941,199, Filed Apr. 6, 1989.

However the mechanism of deriving the uplink power control gain is different as described in the following.

The received C/No can be expressed as follows:

$$\left(\frac{C}{N_o}\right) = EIRP_{sat} - L_{fs,dn} - A_{dn} + \left(\frac{G}{T}\right)_{ref} - k_B (\text{dbHz}) \quad (1.1)$$

where $L_{fs,dn}$(dB) is the free space loss between the satellite and the reference VSAT at frequency $f_{dn}$ (Hz) transmitted from the satellite, $A_{dn}$(dB) is the downlink rain attenuation, $(G/T)_{ref}$ (dB/K) is the figure of merit of the receiving reference terminal, and $k_B$=−228.6 dBW/HzK is the Boltzmann constant. The rain attenuation in the uplink is related to the rain attenuation in the downlink as follows:

$$A_{up} = K + A_{dn} (\text{dB}) \quad (1.2)$$

where for Ku band K is approximately 1.3 dB.
The relation between $C/N_o$ and $E_b/N_o$ is as follows:

$$\left(\frac{C}{N_o}\right) = \left(\frac{E_b}{N_o}\right) + 10 \cdot \log(R_s - MOD \cdot COD)(\text{dbHz}) \quad (1.3)$$

where $R_s$ is the symbol rate, MOD is $\log_2$( ) of the modulation constellation size, and COD is the code rate.

In the following algorithm, the term 'linkbudget' refers to the accounting of all of the gains and losses from the transmitter, through the medium (free space, cable, waveguide, fiber, etc.) to the receiver in a telecommunication system. It accounts for the attenuation of the transmitted signal due to propagation, as well as the antenna gains, feedline and miscellaneous losses.

A simple link budget equation may be as follows:

Received Power(dBm)=Transmitted Power(dBm)+ Gains(dB)−Losses(dB)

It is noted that decibels are logarithmic measurements, so adding decibels is equivalent to multiplying the actual numeric ratios.

A more sophisticated listing of linkbudget components with exemplary measurements is given in table 1 below:

TABLE 1

A LinkBudget for a typical Satellite link.

| Link | Tx Location | Tx Antenna size (m) | BUC (Watt) | BUC OBO (dB) | Rx Antenna size(m) | Data Rate (Kbps) | Modulation | FEC | FEC TYPE |
|---|---|---|---|---|---|---|---|---|---|
| Outbound Best MODCOD | Teleport | 9.10 | 400.00 | 18.16 | 1.20 | 52000.00 | 16APSK | 0.667 | LDPC |
| Outbound Req. Avlldty | Teleport | 9.10 | 400.00 | 18.16 | 1.20 | 26000.00 | QPSK | 0.667 | LDPC |
| Inbound R1A Best MODCOD | VSAT | 1.20 | 2.00 | 3.54 | 9.10 | 32.00 | 8PSK | 0.889 | Turbo |
| Inbound R1B Req. Avlldty | VSAT | 1.20 | 2.00 | 7.34 | 9.10 | 32.00 | 8PSK | 0.667 | Turbo |

| Link | BER | Space Segment (KHz) | Rain Availability | Margin (dB) | % Power of transponder | % BW of transponder | Clear Sky Margin (dB) |
|---|---|---|---|---|---|---|---|
| Outbound Best MODCOD | 1.E−08 | 23400.00 | 91.00% | 2.03 | 71.68 | 65.00 | 2.46 |
| Outbound Req. Avlldty | 1.E−08 | 23400.00 | 99.70% | 2.23 | 71.68 | 65.00 | |
| Inbound R1A Best MODCOD | 1.E−08 | 14.64 | 99.70% | 2.00 | 0.08 | 0.04 | |
| Inbound R1B Req. Avlldty | 1.E−08 | 19.52 | 99.70% | 2.00 | 0.03 | 0.05 | |

Algorithm steps for Case I.
(1) Determine from the linkbudget the highest MODCOD (denoted by HMC) allowed for clear sky conditions so that a predefined requirement for clear sky margin $M_{CS}$ of e.g. 1 dB is met. The required $(C/N_o)$ for clear sky conditions $(C/N_o)_{cs}$, at the reference terminal, is calculated as follows: $(C/N_o)_{cs}=(CNR)_{HMC}+10 \cdot \log(R_S)+M_{CS}+M_{ref}$ (dB Hz), where $(CNR)_{HMC}$ is the lower CNR threshold for the highest MODCOD (see Table 3). If the diameter of the reference terminal is different from the diameter of a typical VSAT antenna in this network the difference $M_{ref}$ in the clear sky margin obtained should be compensated accordingly. This value can be obtained from linkbudget tool by calculating the margin for the standard antenna and for the reference antenna.

(2) Make calibration at clear sky conditions and determine the Tx_PWL required to obtain the desired $(C/No)_{cs}$. This is the $Tx\_PWL_{cs}$ that obtains the desired $EIRP_{sat}$ at clear sky conditions. Calculate $Tx\_PWL_{max}$ by adding the uplink rain fade as found by linkbudget tool for the desired uplink availability. Measure the resulting $(C/No)_{cs}$ for this operating point and use the measured values in all calculations rather than the linkbudget calculated value. This reduces sensitivity to fixed measurements errors. (Note that calibration can be in any MOD-COD lower or equal to HMC).

(3) Measure (C/No) at predefined time intervals and perform averaging over predefined number of measurements to obtain $(C/No)_i$ for the i-th interval. Search the solution for uplink power control gain required at the i+1 time interval $G_{upc,i+1}$ satisfying the following expression Where typically $T_{rain}$=278K, and $T_{ref}=T_{antenna}/1.12+290*0.11+T_{LNB}$ (K). This expression can be solved through numerical methods. It was found by simulation that five iterations provide good accuracy. The iterations can be started by substituting as initial guess $G_{upc,i}$ in $G_{upc,i+1}$, and generating through five iterations the $G_{upc,i+1}$ for the receiver quality $(C/No)_{i+1}$.

(4) The new power level will then be $$Tx\_PWL_{i+1}=Tx\_PWL_{cs}+G_{upc,i+1} \text{(dBW)} \qquad (1.5)$$

A more detailed derivation is given hereinbelow.

AUPC Case II

In this Section we describe the algorithm for maintaining constant satellite transmitted power $EIRP_{sat}$ at all weather conditions by adapting the transmitted Outbound carrier level Tx_PWL to the uplink rain attenuation $A_{up}$, where a reference VSAT, with antenna diameter $D_f$ is installed either (1) at the teleport, and the same satellite beam covers both teleport and all other VSATs in the network, or (2) at another location, and the same satellite beam covers both teleport and all other VSATs in the network, or (3) at another location, and different satellite beams cover the teleport and all other VSATs in the network.

The solution for Case II is based on using measurements performed at the reference VSAT of both CNR (Carrier to Noise Ratio) and SIGL, the received signal level. The measurements can be reported either through a return link or any other communication link.

The instantaneous CNR and SIGL can be read from the receiver chipset which is typically composed of a tuner (e.g. STB6100) and a demodulator (e.g. STB0900).

Typically the CNR is measured after the received signal is filtered by a square root raised-cosine matched filter with $$G_{upc,i+1} = \frac{1}{2} \cdot \left\{ \left(\frac{C}{N_o}\right)_{cs} - \left(\frac{C}{N_o}\right)_{i+1} + K + G_{upc,i} - 10 \cdot \log\left[1 + \left(\frac{T_{rain}}{T_{ref}}\right)\left(1 - 10^{-(G_{upc,i+1}-K/10)}\right)\right] \right\}$$

equivalent noise bandwidth $NBW=R_s$, where $R_s$ is the carrier symbol rate. Consequently $$N_o = \frac{N}{NBW} = \frac{N}{R_s} \text{(Watts/Hz)} \quad (1.6)$$

and $$CNR = \frac{C}{N} = \frac{E_s}{N_o} = \frac{E_b}{N_o} \cdot MOD \cdot COD. \quad (1.7)$$

$C/N_o$ can be expressed as a function of CNR and the symbol rate $R_s$ $$\frac{C}{N_o} = CNR \cdot R_s \text{(Hz)}. \quad (1.8)$$

The received signal level SIGL is measured at the tuner IF input with bandwidth IFBW which is typically larger than the signal 3 dB bandwidth, Rs, in order to allow initial frequency error during acquisition stage. Consequently SIGL can be expressed as follows:

$$SIGL=C(1+\beta)+N(IFBW/Rs)\text{(Watts)} \quad (1.9)$$

where $(1+\beta)$ is the ratio between signal power before and after the matched filter.

Equating N from (1.7) and (1.9) provides $$\frac{C}{CNR} = \frac{SIGL - C(1+\beta)}{IFBW/R_s} \text{(Watts)}, \quad (1.10)$$

resulting in the following expression for the carrier power C as a function of the measured CNR and SIGL, the receiver filter bandwidth IFBW, and the matched filter factor $(1+\beta)$ $$C = \frac{SIGL}{\frac{IFBW}{R_s}\frac{1}{CNR} + 1(1+\beta)} \text{(Watts)}. \quad (1.11)$$

Algorithm Steps for Case II (1) Determine from the linkbudget the highest MODCOD (denoted by HMC) allowed for clear sky conditions so that a predefined requirement for clear sky margin $M_{CS}$ of e.g. 1 dB is met. The required $(C/N_o)$ for clear sky conditions $(C/N_o)_{cs}$, at the reference terminal, is calculated as follows: $(C/N_o)_{cs}=(CNR)_{HMC}+10 \cdot \log(R_S)+M_{CS}+M_{ref}$ (dB Hz), where $(CNR)_{HMC}$ is the lower CNR threshold for the highest MOD-COD (see Table 3). If the diameter of the reference terminal is different from the diameter of a typical VSAT antenna in this network the difference $M_{ref}$ in the clear sky margin obtained should be compensated accordingly. This value can be obtained from linkbudget tool by calculating the margin for the standard antenna and for the reference antenna.

(2) Make calibration at clear sky conditions and determine the Tx_PWL required to obtain the desired $(C/No)_{cs}$. This is the $Tx\_PWL_{cs}$ that obtains the desired $EIRP_{sat}$ at clear sky conditions. Calculate $Tx\_PWL_{max}$ by adding the uplink rain fade as found by linkbudget tool for the desired uplink availability. Measure the resulting $(C/No)_{cs}$ and $(C)_{cs}$ for this operating point and use the measured values in all calculations rather than the linkbudget calculated value. This reduces sensitivity to fixed measurements errors. (Note that calibration can be in any MODCOD lower or equal to HMC).

(3) Measure $(C/N_o)$ and (C) at predefined time intervals and perform averaging over predefined number of measurements to obtain $(C/No)_{i+1}$ and $(C)_{i+1}$. Solve the following expression for $G_{upc,i+1}$, the uplink power control gain required at the i+1 iteration $$G_{upc,i+1} = G_{upc,i} + [C_{cs} - C_{i+1}] + \quad (1.12)$$

$$10\log\left[1 + \frac{T_{ref,cs}}{T_{rain}}\left(1 - 10^{\{[(\frac{C}{N_o})_{cs}-(\frac{C}{N_o})_{i+1}]-[C_{cs}-C_{i+1}]\}/10}\right)\right]\text{(dB)}.$$

Where typically $T_{rain}=278K$, and $T_{ref}=T_{antenna}/1.12+290*0.11+T_{LNB}$ (K). All other values in this expression are in dB.

The new transmitter power level will then be $$Tx\_PWL_{i+1}=Tx\_PWL_{cs}+G_{upc,i+1}\text{(dBW)}. \quad (1.13)$$

A detailed derivation is given hereinbelow.

(4) Optionally measurements can be performed by several reference terminals, or by all terminals, for achieving more reliable decision for the power control gain. Measurements that have large variance can be filtered out while the resulting power control gain per terminal from the other reference terminals can be averaged. Alternatively weighted average can be used where the weights are proportional to the CNR. Therefore after Polling, that is after requesting measurements from all reference terminals, a weighted average calculation may be performed where the weights are proportional to the CNR $$\overline{G}_{upc,i+1} = \frac{\sum_j G_{upc,i+1,j} CNR_j}{\sum_j CNR_j} \text{(dB)}. \quad (1.14)$$

After Interrupt, that is after a terminal pushes its measurements when it measures a significant change between Pollings, a weighted update of the last result may be performed $$\overline{G}_{upc,i+1}=(1-\gamma)\overline{G}_{upc,i}+\gamma G_{upc,i+1}\text{(dB)}, 0<\gamma<1 \quad (1.15)$$

The last step of the algorithm is useful also for reducing the effect of reference VSAT pointing loss. The algorithm cannot distinguish between rain and variations in pointing loss. Therefore, such variations in pointing loss of the teleport antenna or the reference terminals may be interpreted erroneously as uplink rain attenuation as they do not affect the VSAT noise level. The weighted average step can reduce the VSAT pointing loss effect as the pointing loss varies independently from VSAT to VSAT.

AUPC Case III

In this Section we describe the algorithm for maintaining constant satellite transmitted power $EIRP_{sat}$ at all weather conditions by adapting the transmitted Outbound carrier level Tx_PWL to the uplink rain attenuation $A_{up}$, where a reference VSAT, with antenna diameter $D_{ref}$ is installed either (1) at the teleport, and the same satellite beam covers both teleport and all other VSATs in the network, or (2) at another location, and the same satellite beam covers both teleport and all other VSATs in the network, or (3) at another location, and different satellite beams cover the teleport and all other VSATs in the network.

The solution for Case III is based on using measurements performed at both ends of the link, e.g. at the Teleport and at the reference VSAT (or at both ends of SCPC link) of received CNR (Carrier to Noise Ratio) for both Forward and Return links. The measurements can be reported either through the return link or any other communication link.

The CNR equation that is shown by (B.14) can be used for both Forward and Return links with appropriate indication of all parameters, where "F" stands for Forward link and "R" stands for Return link. For the Forward link the expression is as follows:

$$_F\left(\frac{C}{N_o}\right)_{i+1} = {}_F\left(\frac{C}{N_o}\right)_{cs} + {}_FG_{upc,i} - {}_FA_{up,i+1} - {}_FA_{dn,i+1} - \qquad (2.16)$$

$$10\log\left[1 + \frac{T_{rain}}{{}_FT_{ref,cs}}\left(1 - 10^{-{}_FA_{dn,i+1}/10}\right)\right](\text{dBHz}).$$

For the Return link the expression is as follows:

$$_R\left(\frac{C}{N_o}\right)_{i+1} = {}_R\left(\frac{C}{N_o}\right)_{cs} + {}_RG_{upc,i} - {}_RA_{up,i+1} - {}_RA_{dn,i+1} - \qquad (2.17)$$

$$10\log\left[1 + \frac{T_{rain}}{{}_RT_{ref,cs}}\left(1 - 10^{-{}_RA_{dn,i+1}/10}\right)\right](\text{dBHz}).$$

The rain attenuation in the uplink is related to the rain attenuation in the downlink, with a factor $K_T$ for the teleport side and a factor $K_v$ for the VSAT side, as follows:

$$_FA_{up} = K_T + {}_RA_{dn} (\text{dB}) \qquad (1.18)$$

$$_RA_{up} = K_V + {}_RA_{dn} (\text{dB}) \qquad (1.19)$$

Substituting for $A_{dn}$ in the above CNR equations produces the following two expressions for $_FA_{up}$ and $_RA_{up}$.

$$_RA_{up,i+1} = K_V = \left\{{}_F\left(\frac{C}{N_o}\right)_{cs} - {}_F\left(\frac{C}{N_o}\right)_{i+1} + {}_FG_{upc,i} - \qquad (2.20)\right.$$
$$\left. {}_FA_{up,i+1} - 10\log\left[1 + \frac{T_{rain}}{{}_FT_{ref,cs}}\left(1 - 10^{-({}_RA_{up,i+1}-K_V)/10}\right)\right]\right\}(\text{dBHz})$$

$$_FA_{up,i+1} = K_T = \left\{{}_R\left(\frac{C}{N_o}\right)_{cs} - {}_R\left(\frac{C}{N_o}\right)_{i+1} + {}_RG_{upc,i} - \qquad (2.21)\right.$$
$$\left. {}_RA_{up,i+1} - 10\log\left[1 + \frac{T_{rain}}{{}_RT_{ref,cs}}\left(1 - 10^{-({}_FA_{up,i+1}-K_T)/10}\right)\right]\right\}(\text{dBHz}).$$

These two equations can be solved with cross iterations, namely initially substituting guesses for both $_FA_{up}$ and $_RA_{up}$ in the first equation. N iterations are then performed for $_RA_{up}$, and then the result is substituted in the second equation. Now N iterations are performed for $_FA_{up}$, and then the cross iterations are repeated N times. Alternatively a look up table could be used.

Combined AUPC and ACM

The ACM mechanism can be operated to compensate for both uplink and down link fades, or for downlink compensation independently, see Lawrence W. Krebs et al., "Methods and Apparatus For Mitigating Rain Fading Over Satcom Links Via Information Throughput Adaptation", US Patent Application Publication 2003/0054816, Filed Aug. 8, 2002; ETSI EN 302 307 V1.1.1 (2004-01): "Digital Video Broadcasting (DVB) Second generation framing structure, channel coding and modulation systems for Broadcasting, Interactive Services, News Gathering and other broadband satellite applications"; and Alberto Morello, Vittoria Mignone, "DVB-S2: The Second Generation Standard for Satellite Broad-band Services", Proceedings of the IEEE, vol. 94, no. 1, pp. 210-227, January 2006. In the latter a beacon receiver is used for uplink power control, or uplink is transmitted via a C band beam, or the transponder operates at ALC—Automatic Level Control mode. The ACM mechanism can alternatively be combined with AUPC.

The present embodiments provide a combined AUPC and ACM controller designed to achieve overall optimization based on allowed usage of satellite resources. The controller algorithm uses channel measurements performed by the receiving stations that are sent back to the controller. The receiving stations are standard stations that provide service and can be located anywhere, under any beam of the satellite. Measurements performed by several or all stations can be used for improving the uplink channel estimations. The uplink control is designed to maintain constant satellite transmitted power at all weather conditions by adapting the transmitted carrier level to the uplink rain attenuation. The adaptation of coding and modulation is designed to maintain constant received signal quality at each terminal according to the downlink rain degradation affecting this terminal. The adjustment for each terminal is implemented by the modulator by transmitting, in time-division multiplex, a sequence of frames, where the coding and modulation format may change frame-by-frame. The traffic of a terminal that was assigned a specific MODOCD—see table 2 below, may be transmitted in the appropriate frame.

The uplink and down link adaptation are based on the same channel measurements. The present embodiments may separate the effects of the uplink and down link as reflected from the channel measurements performed by the receiving stations. As the uplink control influences the downlink performance, the present embodiments perform combined control of uplink and downlink by deducting the effect of the uplink control from the current channel measurements in order to allow for computing of the downlink control stage using the same current set of measurements. This reduces the control cycle time and the number of modulation and coding corrections as there is no need to wait for the next updated measurements that would be affected by the uplink update for correctly updating the downlink modulation and coding.

FIG. 4, already referred to above shows the scheme of an AUPC & ACM Management system, comprising the AUPC & ACM Controller 40, the ACM modulator 42, which includes the upconverter and the HPA—High Power Amplifier, the Earth station 10, and the satellite 12. The satellite terminals (VSAT) 18.1 ... 18.n are connected to the AUPC & ACM Controller via return links. The terminals submit the CNR and SIGL measurements to the Controller. The ACM modulator operates at constant symbol rate, since the available transponder bandwidth is assumed to be constant. ACM is implemented by the modulator by transmitting, in time-division multiplex, a sequence of frames, where the coding and modulation format may change frame-by-frame. Each frame can carry traffic to terminals that know to expect the coding and modulation levels assigned to that frame. Therefore, service continuity is achieved, during rain fades, by reducing user bits while increasing, at the same time, the FEC redundancy and/or modulation ruggedness. Physical layer adaptation is achieved as follows.

1) Each VSAT measures the channel status (CNR and SIGL) and reports it via the return link to the Controller.

2) The VSAT reports are taken into account by the Controller for deciding on updating the modulator Tx_PWL for compensating for uplink degradation and for selecting the MODCOD for data packets addressed to that VSAT.

3) In order to avoid information overflow during fades, traffic shaping may be implemented, using traffic shaper 44 to adapt the offered traffic to the available channel capacity. Thus for example during fades, television image quality may be degraded.

The AUPC and ACM update cycle is composed of the following stages:
1) Receiving updated channel status measurements,
2) Calculating uplink rain attenuation and updating the AUPC gain control
3) Adding the increment in AUPC gain control to correct the channel measurements
4) Using the corrected channel measurements for selecting the MODCOD The importance of making the correction phase within a combined AUPC and ACM cycle is as follows: Both AUPC and ACM update can be performed on the same set of channel measurements thus reducing the cycle period. Shortening the cycle period allows the required margin to be decreased. That is more efficient use is made of the scarce satellite resources allocated for compensating for fast rain fading. Otherwise if only AUPC is performed initially, ACM may be performed on a later measurement of channel status taken after the AUPC update already affected the measurements.

The channel measurement correction can be expressed by $$(\overline{CNR}_{i+1}) = (CNR_{i+i}) + G_{upc,i+1} (\text{dBHz}). \tag{2.22}$$

See equations (2.7) and (2.8) above for the relations between $(E_b/N_o)$ and (CNR) and between $(C/N_o)$ and (CNR).

A typical table with selection of MODCODs for DVB-S2 is shown as Table 2 below. A typical example for a MODCOD threshold table showing the upper and lower thresholds for selecting a MODCOD is given in Table 3 below. The (CNR) ranges for neighbor MODCODs are partly superposed in order to reduce number of MODCOD switching when (CNR) is near the border between two MODCODs. The combined process of AUPC and ACM is shown in the flow chart of FIG. 5. Periodic polling is carried out of all VSATs (receiving stations). On periodical Polling of all VSATs. Interrupts are generated by individual VSATs and occur between Polling events when the particular VSAT needs to correct its MODCOD for maintaining its received signal quality. In order to reduce the number of interrupts, each individual VSAT can calculate the current downlink attenuation based on expression (B.16) and determine if the variation it has measured in its CNR corresponds also to downlink attenuation variation or only to uplink attenuation variation. In the latter case a VSAT, which is not a reference terminal, will not issue an interrupt with a request for MODCOD change but will wait for the AUPC to compensate for the uplink attenuation variation. We can thus define the following expression $$\left\{ \left[ \left(\frac{C}{N_o}\right)_{cs} - \left(\frac{C}{N_o}\right)_{i+1} \right] - [(C_{cs}) - (C_{i+1})] \right\}$$

dB as an indicator for downlink attenuation as if it equals zero (or close to zero with predefined accuracy) the downlink attenuation in expression (B.16) is also zero.

| Mode | MODCOD |
|---|---|
| QPSK 1/4 | $1_0$ |
| QPSK 1/3 | $2_0$ |
| QPSK 2/5 | $3_0$ |
| QPSK 1/2 | $4_0$ |
| QPSK 3/5 | $5_0$ |
| QPSK 2/3 | $6_0$ |
| QPSK 3/4 | $7_0$ |
| QPSK 4/5 | $8_0$ |
| QPSK 5/6 | $9_0$ |
| QPSK 8/9 | $10_0$ |
| QPSK 9/10 | $11_0$ |
| 8PSK 3/5 | $12_0$ |
| 8PSK 2/3 | $13_0$ |
| 8PSK 3/4 | $14_0$ |
| 8PSK 5/6 | $15_0$ |
| 8PSK 8/9 | $16_0$ |
| 8PSK 9/10 | $17_0$ |
| 16APSK 2/3 | $18_0$ |
| 16APSK 3/4 | $19_0$ |
| 16APSK 4/5 | $20_0$ |
| 16APSK 5/6 | $21_0$ |
| 16APSK 8/9 | $22_0$ |
| 16APSK 9/10 | $23_0$ |
| 32APSK 3/4 | $24_0$ |
| 32APSK 4/5 | $25_0$ |
| 32APSK 5/6 | $26_0$ |
| 32APSK 8/9 | $27_0$ |
| 32APSK 9/10 | $28_0$ |
| Reserved | $29_0$ |
| Reserved | $30_0$ |
| Reserved | $31_0$ |
| DUMMY PLFRAME | $0_0$ |

MODCOD Table 2 from ETSI EN302307 reference above.

TABLE 3

Example for MODCOD Thresholds Table

| MODCOD | Modulation | MOD | Code Rate | Ideal CNR | CNR Lower Threshold | CNR Upper Threshold | Ideal Eb/No | Spetral Efficiency bps/Hz | Pilots | Recommended Allowed Lists | | | |
|---|---|---|---|---|---|---|---|---|---|---|---|---|---|
| | | | | | | | | | | QPSK | Q/8PSK | Q/8/16 | Q/8/16/32 |
| 1 | QPSK | 2 | 0.250 | −2.35 | −infinity | −0.44 | 0.7 | 0.42 | Off | v | v | v | v |
| 2 | QPSK | 2 | 0.333 | −1.24 | −0.64 | 0.50 | 0.5 | 0.56 | Off | v | v | v | v |
| 3 | QPSK | 2 | 0.400 | −0.30 | 0.30 | 1.80 | 0.7 | 0.67 | Off | v | v | v | v |
| 4 | QPSK | 2 | 0.500 | 1.00 | 1.60 | 2.80 | 1.0 | 0.83 | Off | v | v | v | v |
| 5 | QPSK | 2 | 0.600 | 2.23 | 2.60 | 3.50 | 1.4 | 1.00 | Off | v | v | v | v |

TABLE 3-continued

Example for MODCOD Thresholds Table

| MODCOD | Modulation | MOD | Code Rate | Ideal CNR | CNR Lower Threshold | CNR Upper Threshold | Ideal Eb/No | Spetral Efficiency bps/Hz | Pilots | Recommended Allowed Lists | | | |
|---|---|---|---|---|---|---|---|---|---|---|---|---|---|
| | | | | | | | | | | QPSK | Q/8PSK | Q/8/16 | Q/8/16/32 |
| 6 | QPSK | 2 | 0.667 | 3.10 | 3.30 | 4.40 | 1.9 | 1.11 | Off | v | v | v | v |
| 7 | QPSK | 2 | 0.750 | 4.03 | 4.20 | 5.00 | 2.3 | 1.25 | Off | v | v | v | v |
| 8 | QPSK | 2 | 0.800 | 4.68 | 4.80 | 5.60 | 2.6 | 1.33 | Off | v | v | v | v |
| 9 | QPSK | 2 | 0.833 | 5.18 | 5.40 | 6.50 | 3.0 | 1.39 | Off | v | v | v | v |
| 10 | QPSK | 2 | 0.889 | 6.20 | 6.40 | 6.90 | 3.7 | 1.48 | Off | v | | | |
| 11 | QPSK | 2 | 0.900 | 6.42 | 6.70 | +infinity | 3.9 | 1.50 | Off | v | | | |
| 12 | 8PSK | 3 | 0.600 | 5.50 | 6.00 | 7.10 | 2.9 | 1.50 | On | | v | v | v |
| 13 | 8PSK | 3 | 0.667 | 6.62 | 6.90 | 8.40 | 3.6 | 1.67 | On | | v | v | v |
| 14 | 8PSK | 3 | 0.750 | 7.91 | 8.20 | 9.80 | 4.4 | 1.88 | On | | v | v | v |
| 15 | 8PSK | 3 | 0.833 | 9.35 | 9.70 | 11.30 | 5.4 | 2.08 | On | | v | | |
| 16 | 8PSK | 3 | 0.889 | 10.69 | 11.10 | 11.60 | 6.4 | 2.22 | On | | v | | |
| 17 | 8PSK | 3 | 0.900 | 10.98 | 11.40 | +infinity | 6.7 | 2.25 | On | | v | | |
| 18 | 16APSK | 4 | 0.667 | 8.97 | 9.47 | 10.91 | 4.7 | 2.22 | On | | | v | v |
| 19 | 16APSK | 4 | 0.750 | 10.21 | 10.71 | 11.73 | 5.4 | 2.50 | On | | | v | v |
| 20 | 16APSK | 4 | 0.800 | 11.03 | 11.53 | 12.31 | 6.0 | 2.67 | On | | | v | v |
| 21 | 16APSK | 4 | 0.833 | 11.61 | 12.11 | 13.50 | 6.4 | 2.78 | On | | | v | v |
| 22 | 16APSK | 4 | 0.889 | 12.89 | 13.39 | 13.83 | 7.4 | 2.96 | On | | | v | |
| 23 | 16APSK | 4 | 0.900 | 13.13 | 13.63 | +infinity | 7.6 | 3.00 | On | | | v | |
| 24 | 32APSK | 5 | 0.750 | 12.73 | 13.23 | 14.34 | 7.0 | 3.13 | On | | | | v |
| 25 | 32APSK | 5 | 0.800 | 13.64 | 14.14 | 14.98 | 7.6 | 3.33 | On | | | | v |
| 26 | 32APSK | 5 | 0.833 | 14.28 | 14.78 | 16.39 | 8.1 | 3.47 | On | | | | v |
| 27 | 32APSK | 5 | 0.889 | 15.69 | 16.19 | 16.75 | 9.2 | 3.70 | On | | | | v |
| 28 | 32APSK | 5 | 0.900 | 16.05 | 16.55 | +infinity | 9.5 | 3.75 | On | | | | v |

Note if the lower threshold is crossed going downward, the MODCOD will be reduced.
If the upper threshold is crossed going upward, the MODCOD will be increased.

Figure 5:
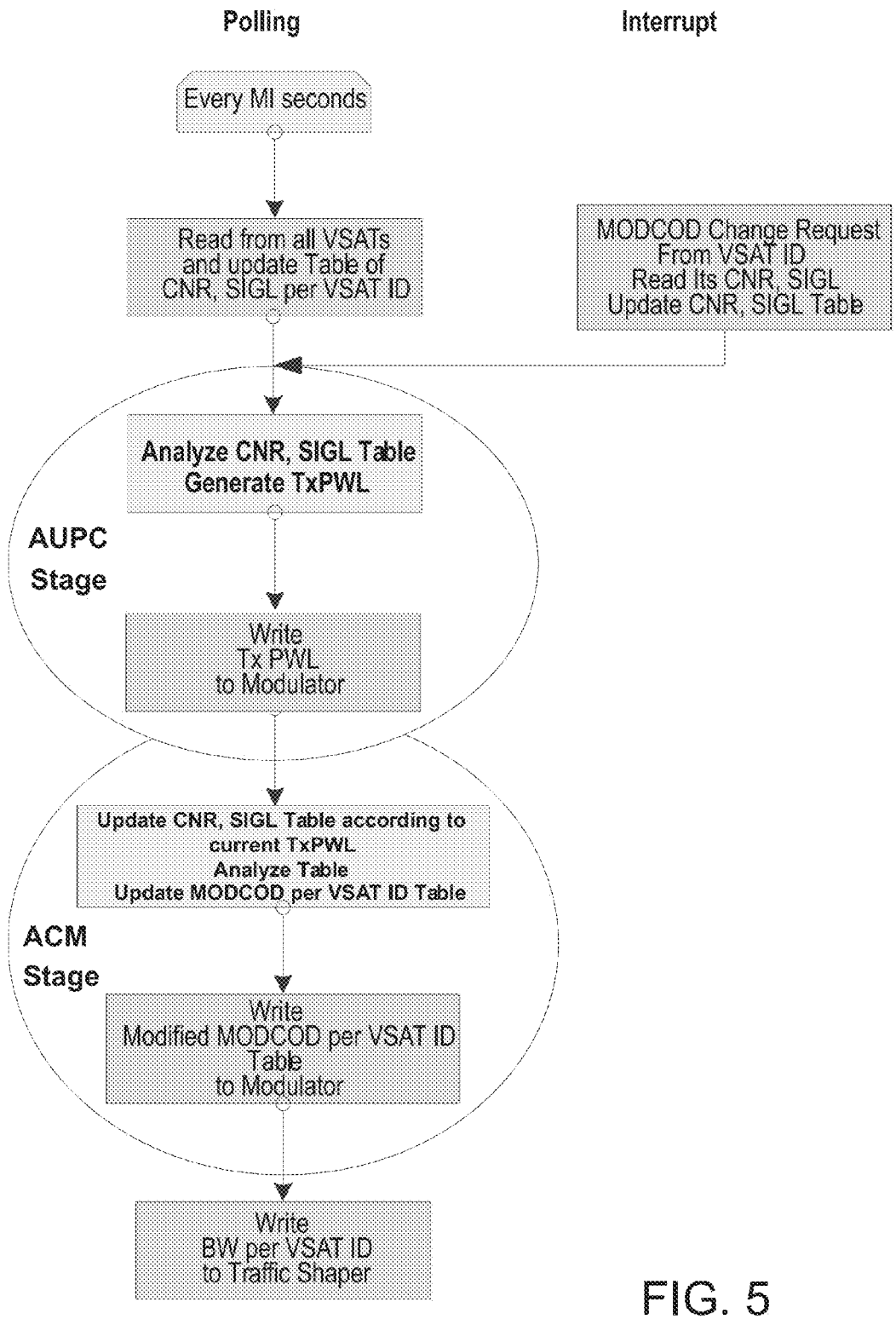

In other words the combined process of AUPC and ACM, as shown in FIG. 5 is based on periodical Polling of all VSATs and obtaining interrupts generated by individual VSATs between Polling events when the VSAT needs to correct its MODCOD for maintaining its received signal quality.

Selection of MODCODs for Analysis and Efficient Operation

Figure 7:
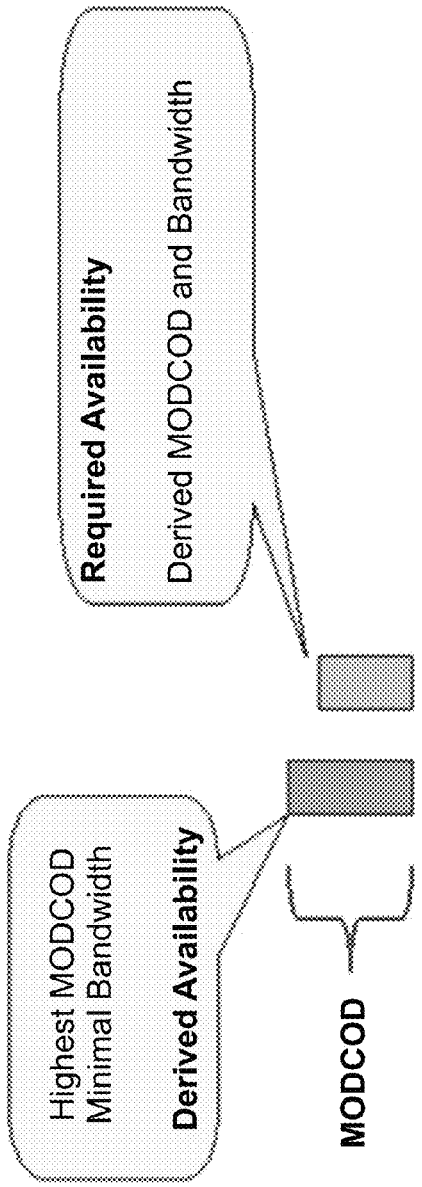

Reference is now made to FIG. 7, which is a simplified diagram illustrating MODCOD and bandwidth relationships. For the purpose of analysis and efficient operation it is desirable to simplify the scenario. We propose here two stages of reducing the number of operational MODCODs.

Stage 1: Partition the service territory into regions characterized by significantly different satellite coverage strength and/or climate conditions. Select two MODCODs per each such region by assuming two modes of operation, Mode 1: "Highest MODCOD" (HMC) which can be used in the region based on the satellite EIRP and earth stations capabilities, for near to clear sky conditions, and the availability that corresponds to such a MODCOD, called "Derived Availability" ($A_{HMC}$). Typically the availability that reflects near to clear sky conditions will be about 95%. Mode 2: "Required Availability" ($A_{RQ}$) and the corresponding "Derived MODCOD" (DMC) that can satisfy such availability. Such two modes with appropriate MODCODs prevail in each region.

We can use efficiency in terms of bps/Hz (bps stands for bit per second) as an indication of the achieved throughput or consumed bandwidth per each MODCOD. The efficiency per MODCOD is give by $g = MOD*COD/(1+\alpha)$ The total efficiency per region is defined by $g_i = g_{HMC} \cdot A_{HMC} + g_{DMC} \cdot (A_{RQ} - A_{HMC})$ The system efficiency G is calculated using the traffic distribution as follows:

$$G = \frac{\sum_i Traffic_i \cdot g_i}{\sum_i Traffic_i}$$

Where $Traffic_i$ is the aggregate traffic for region i. The following table 4 describes a case study based on the above method. For example in Region 2, HMC is 16APSK 0.833 and is active $A_{HMC}$=96.0% of the time, and DMC is 8PSK 0.75 and is active $A_{RQ}$-$A_{HMC}$=99.7%-96.0%=3.7% of the time, achieving as result the required availability of 99.7%.

TABLE 4

Case study for analysis based on partitioning to regions and two MODCODs per region.

| | | Region 1 | Region 2 | Region 3 | Region 4 |
|---|---|---|---|---|---|
| Best MODCOD | Throughput, Mbps | 105,000 | 100,000 | 80,000 | 105,000 |
| | MOD | 16APSK | 16APSK | 16APSK | 16APSK |
| | COD | 0.875 | 0.833 | 0.667 | 0.875 |
| | Availability % $A_{HMC}$ | 99.30 | 96.00 | 94.00 | 98.45 |
| | Efficiency bps/Hz | 2.92 | 2.78 | 2.22 | 2.92 |

TABLE 4-continued

Case study for analysis based on partitioning to regions and two MODCODs per region.

|  |  | Region 1 | Region 2 | Region 3 | Region 4 |
|---|---|---|---|---|---|
| Req. Availability | Throughput, Mbps | 90,000 | 67,500 | 36,000 | 80,000 |
|  | MOD | 16APSK | 8PSK | QPSK | 16APSK |
|  | COD | 0.750 | 0.750 | 0.600 | 0.667 |
|  | Availability % $A_{RQ}$ | 99.70 | 99.70 | 99.70 | 99.70 |
|  | Delta Availability % | 0.40 | 3.70 | 5.70 | 1.25 |
|  | Efficiency bps/Hz | 2.50 | 1.88 | 1.00 | 2.22 |
| Total Outbound performance | Total efficiency bps/Hz | 2.91 | 2.74 | 2.15 | 2.90 |
|  | Traffic Distribution % | 52.7 | 4.2 | 37.1 | 6.0 |
|  | System efficiency bps/Hz |  | 2.62 |  |  |
|  | ACM gain |  | 162% |  |  |

Figure 8:
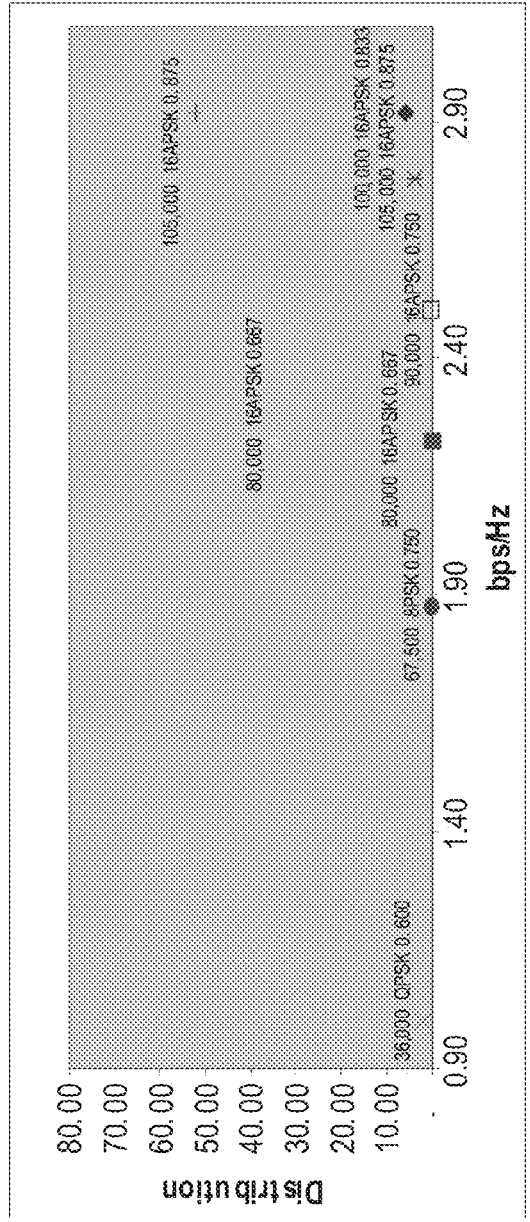

For the purpose of operation it is also desirable to reduce the number of instantaneously operational MODCODs. The ACM based carrier (e.g. DVB-S2) is built from blocks of coded traffic. Each block has a fixed MODCOD for the traffic carried in it. The traffic that waits for transmission in the buffer is waiting for a block with the appropriate MODCOD. If the number of MODCODs is large there are many queues of traffic waiting for a turn to be transmitted. Traffic with a rarely used MODCOD may indeed have to wait a long time until their turn comes. There will be large variations in the delay which are not suitable for interactive applications. For the above case study, FIG. 8 describes the distribution of MOD-CODs. This distribution is generated by weighing each MODCOD with its activity factor (availability for HMC or Delta availability for DMC) and with the traffic fraction using it, namely the traffic per that region scaled by the total traffic. Actually we can reduce at this stage the number of MOD-CODs to those selected in the analysis described above and achieve the performance obtained by the analysis. In the case study shown here six different MODCODs are needed.

Stage 2: Further reduction of the number of MODCODs in order to eliminate MODCODs with low utilization.

Figure 9:
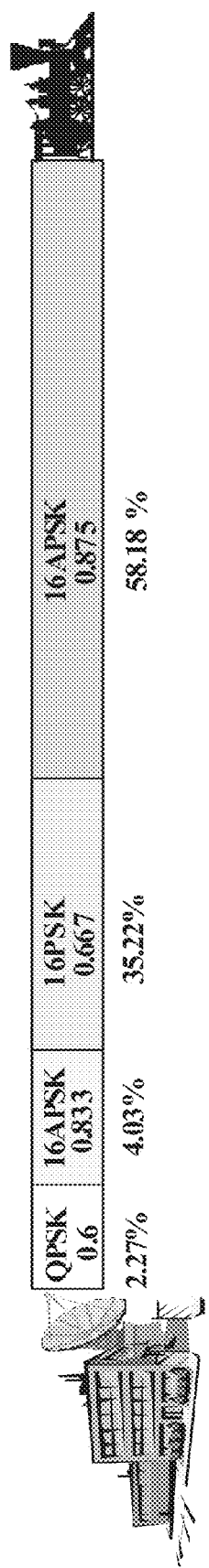

A method for further reduction in the number of MOD-CODs can be based on using the set of MODCODs selected in Stage 1 and eliminating those of low utilization, e.g. less than 1% of the time. The rule is that traffic that needs a certain MODCOD may fall to the next low allowed MODCOD. In such a method the lowest MODCOD should be kept in the allowed list. In the case study shown here two of the six MODCODs that remained after Stage 1 may be eliminated with insignificant degradation in the system efficiency. FIG. 9 illustrates a series of MODCODs each with different levels of traffic.

Rules for adjusting the MODCOD table (Table 3):

When few of the MODCODs are disabled, the thresholds will be calculated as follows:

1. The lower Threshold of the lowest allowed MODCOD is unlimited (−infinity)
2. The lower thresholds of allowed MODCODs (other than the lowest allowed MODCOD) are in force.
3. The upper thresholds of allowed MODCODs are recalculated:

Upper_Threshold(Any_MODCOD)=Lower_Threshold(NEXT_higher_allowed MODCOD)+Margin, where the margin is typically 0.2 dB.

4. The upper threshold of the highest allowed MODCOD is unlimited (+infinity)

In the following we provide the detailed derivation of the expression for the uplink power control gain required at the i+1 iteration $g_{upc,i+1}$ for case 1 above.

The received $C/N_o$ can be expressed as follows:

$$\left(\frac{C}{N_o}\right) = EIRP_{sat} - L_{fs,dn} - A_{dn} + \left(\frac{G}{T}\right)_{ref} - k_B (\text{dBHz}) \quad (A.1)$$

At the i+1 iteration the transmitted EIRP becomes:

$$EIRP_{i+1} = EIRP_{sat} - A_{up,i+1} + G_{upc,i} (\text{dBW}) \quad (A.2)$$

Where $EIRP_{sat}$ is the EIRP that should be maintained constant, $A_{up,i+1}$ is the rain attenuation at the i+1 iteration, and $G_{upc,i}$ is the control gain applied at the i-th iteration. Consequently the received $C/N_o$ will become:

$$\left(\frac{C}{N_o}\right)_{i+1} = EIRP_{i+1} - L_{fs,dn} - A_{dn,i+1} + \left(\frac{G}{T}\right)_{ref,i+1} - k_B \quad (A.3)$$

Substituting (A.1) at clear sky ($A_{dn}=0$) into (A.2) and the result in (A.3), and also using the relation $A_{up}=K+A_{dn}$, the following expression is obtained $$\left(\frac{C}{N_o}\right)_{i+1} = \left(\frac{C}{N_o}\right)_{cs} + L_{fs,dn} - \left(\frac{G}{T}\right)_{ref,cs} + k_B -$$
$$A_{up,i+1} + G_{upc,i} - L_{fs,dn} - A_{up,i+1} + K + \left(\frac{G}{T}\right)_{ref,i+1} - k_B$$

After simplification it becomes $$\left(\frac{C}{N_o}\right)_{i+1} = \quad (A.4)$$
$$\left(\frac{C}{N_o}\right)_{cs} - \left(\frac{G}{T}\right)_{ref,cs} - 2A_{up,i+1} + K + G_{upc,i} + \left(\frac{G}{T}\right)_{ref,i+1} (\text{dBHz})$$

Consequently the estimated uplink rain attenuation can be expressed as $$A_{up,i+1} = \frac{1}{2}\left\{\left(\frac{C}{N_o}\right)_{cs} - \left(\frac{C}{N_o}\right)_{i+1} + K + G_{upc,i} - \left[\left(\frac{G}{T}\right)_{ref,cs} - \left(\frac{G}{T}\right)_{ref,i+1}\right]\right\} (\text{dB}) \quad (A.5)$$

$$G_{upc,i} = \text{Tx\_PWL}_i - \text{Tx\_PWL}_{cs} (\text{dB}) \quad (A.6)$$

Finally the control gain for the i+1 iteration should be found from the following $$G_{upc,i+1} = \frac{1}{2} \cdot \left\{ \left(\frac{C}{N_o}\right)_{cs} - \left(\frac{C}{N_o}\right)_{i+1} + K + G_{upc,i} - 10 \cdot \log\left[1 + \left(\frac{T_{rain}}{T_{ref}}\right)\left(1 - 10^{-(G_{upc,i+1}-K)/10}\right)\right]\right\}(dB) \quad (A.7)$$

Where typically $T_{rain}$=278K, and $T_{ref}$=$T_{antenna}$/1.12+ 290*0.11+$T_{LNB}$ (K) See Maral and Bousquet pp. 191-192.

In the following we provide the detailed derivation of the expression for the uplink power control gain required at the i+1 iteration, using measurement of CNR and Signal Level, for CASE II above.

Development of the Received Carrier Power Equation:

The received carrier power can be expressed by $$(C)=EIRP_{sat}-L_{fs,dn}-A_{dn}+G_{ref}-A_{Rx}(dBW) \quad (B.1)$$

where $L_{fs,dn}$(dB) is the free space loss between the satellite and the reference VSAT at frequency $f_{dn}$ (Hz) transmitted from the satellite, $A_{dn}$(dB) is the downlink rain attenuation, $G_{ref}$(dB) is the gain of the reference terminal antenna, and $A_{Rx}$ is the receiver RF/IF chain loss. It is assumed that the CNR at the uplink is high and all the $EIRP_{sat}$ transmitted by the satellite is used only by the desired signal.

At the i+1 iteration the transmitted EIRP becomes $$EIRP_{i+1}=EIRP_{sat}-A_{up,i+1}+G_{upc,i}(dBW). \quad (B.2)$$

Where $EIRP_{sat}$ is the EIRP that should be maintained constant, $A_{up,i+1}$ is the rain attenuation at the i+1 iteration, and $G_{upc,i}$ is the control gain applied at the i-th iteration. Consequently the received carrier power (C) will become:

$$(C_{i+1})=EIRP_{i+1}-L_{fs,dn}-A_{dn,i+1}+G_{ref}-A_{Rx}(dBW). \quad (B.3)$$

Substituting (B.1) at clear sky ($A_{dn}$=0) into (B.2) and the result in (B.3), the following expression is obtained:

$$(C_{i+1})=(C_{cs})+L_{fs,dn}-G_{ref}+A_{Rx}-A_{up,i+1}+G_{upc,i}-L_{fs,dn}-A_{dn,i+1}+G_{ref}-A_{Rx}(dBW) \quad (B.4)$$

where $(C_{cs})$ is the received carrier power at clear sky. After simplification it becomes the Carrier Power equation:

$$(C_{i+1})=(C_{cs})+G_{upc,i}-A_{up,i+1}-A_{dn,i+1}(dBW). \quad (B.5)$$

Development of the CNR Equation:

The received C/$N_o$ can be expressed as follows:

$$\left(\frac{C}{N_o}\right) = EIRP_{sat} - L_{fs,dn} - A_{dn} + \left(\frac{G}{T}\right)_{ref} - k_B(dBHz). \quad (B.6)$$

At the i+1 iteration the transmitted EIRP becomes:

$$EIRP_{i+1}=EIRP_{sat}-A_{up,i+1}+G_{upc,i}(dBW). \quad (B.7)$$

Where $EIRP_{sat}$ is the satellite EIRP that should be maintained constant, $A_{up,i+1}$ is the rain attenuation at the i+1 iteration, and $G_{upc,i}$ is the control gain applied at the i-th iteration. Consequently the received (C/$N_o$) will become:

$$\left(\frac{C}{N_o}\right)_{i+1} = EIRP_{i+1} - L_{fs,dn} - A_{dn,i+1} + \left(\frac{G}{T}\right)_{ref,i+1} - k_B(dBHz). \quad (B.8)$$

Substituting (B.6) at clear sky ($A_{dn}$=0) into (B.7) and the result in (B.8), the following expression is obtained:

$$\left(\frac{C}{N_o}\right)_{i+1} = \left(\frac{C}{N_o}\right)_{cs} + L_{fs,dn} - \left(\frac{G}{T}\right)_{ref,cs} + k_B - A_{up,i+1} + G_{upc,i} - L_{fs,dn} - A_{dn,i+1} + \left(\frac{G}{T}\right)_{ref,i+1} - k_B(dBHz). \quad (B.9)$$

After simplification it becomes $$\left(\frac{C}{N_o}\right)_{i+1} = \left(\frac{C}{N_o}\right)_{cs} + G_{upc,i} - A_{up,i+1} - A_{dn,i+1} - \left[\left(\frac{G}{T}\right)_{ref,cs} - \left(\frac{G}{T}\right)_{ref,i+1}\right](dBHz). \quad (B.10)$$

As per Maral and Bousquet page 31, the difference in received noise temperature can be expressed by:

$$\Delta T = T_{ref,i+1} - T_{ref,cs} = T_{rain}(1-10^{-A_{dn,i+1}/10})(K). \quad (B.11)$$

The difference in the figure of merit G/T can be expressed by $$\left[\left(\frac{G}{T}\right)_{ref,cs} - \left(\frac{G}{T}\right)_{ref,i+1}\right] = 10\log\left(\frac{T_{ref,i+1}}{T_{ref,cs}}\right) = 10\log\left(1 + \frac{\Delta T}{T_{ref,cs}}\right)(dB). \quad (B.12)$$

By substituting $\Delta T$ from equation (B.11) the following expression is obtained $$\left[\left(\frac{G}{T}\right)_{ref,cs} - \left(\frac{G}{T}\right)_{ref,i+1}\right] = 10\log\left[1 + \frac{T_{rain}}{T_{ref,cs}}\left(1 - 10^{-A_{dn,i+1}/10}\right)\right](dB). \quad (B.13)$$

Finally the CNR equation is obtained by substituting (B.13) into (B.10):

$$\left(\frac{C}{N_o}\right)_{i+1} = \left(\frac{C}{N_o}\right)_{cs} + G_{upc,i} - A_{up,i+1} - A_{dn,i+1} - 10\log\left[1 + \frac{T_{rain}}{T_{ref,cs}}\left(1 - 10^{-A_{dn,i+1}/10}\right)\right](\text{dBHz}). \quad (B.14)$$

Now by combining the Carrier Power Equation (B.5) and the CNR Equation (B.14) through equating $G_{upc,i} - A_{up,i+1} - A_{dn,i+1}$ the following expression is obtained $$\left(\frac{C}{N_o}\right)_{i+1} = \left(\frac{C}{N_o}\right)_{cs} + (C_{i+1}) - (C_{cs}) - 10\log\left[1 + \frac{T_{rain}}{T_{ref,cs}}\left(1 - 10^{-A_{dn,i+1}/10}\right)\right](\text{dBHz}) \quad (B.15)$$

Which after simplification leads to the following expression for the down link attenuation $$A_{dn,i+1} = -10\log\left[1 + \frac{T_{ref,cs}}{T_{rain}}\left(1 - 10^{\left\{\left[\left(\frac{C}{N_o}\right)_{cs} - \left(\frac{C}{N_o}\right)_{i+1}\right] - \left[(C_{cs}) - (C_{i+1})\right]\right\}}\right)\right] \quad (\text{dB}). \quad (B.16)$$

Consequently by using the Carrier Power Equation (B.5) the uplink rain attenuation can be expressed by $$A_{up,i-1} = (C_{cs}) - (C_{i+1}) + G_{upc,i} - A_{dn,i+1}(\text{dB}) \quad (B.17)$$

where the gain control $G_{upc,i}$ at the i-th iteration can be expressed by the transmitter power level at the i-th iteration with respect to power level at clear sky $$G_{upc,i} = Tx\_PWL_i - Tx\_PWL_{cs}(\text{dB}). \quad (B.18)$$

Finally the control gain applied at the i+1 iteration $G_{upc,i+1}$ should be equal to $A_{up,i+1}$ in order to maintain $EIPR_{sat}$ constant as required $$G_{upc,i+1} = A_{up,i+1} = (C_{cs}) - (C_{i+1}) + G_{upc,i} - A_{dn,i+1}(\text{dB}) \quad (B.19)$$

where $A_{dn,i+1}$ is given by (B.16).

It is expected that during the life of this patent many relevant devices and systems will be developed and the scope of the terms herein, is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A satellite broadcasting system for communication between a satellite hub and a range of ground stations in which a set having a predetermined number of MODCODS is available for data transmission from the satellite hub to the ground stations, each MODCOD utilizing resources, the system comprising:
   a MODCOD limiter configured to limit the number of MODCODs in operation at a given time to a subset smaller than said predetermined number of MODCODS, wherein said ground stations are partitioned into regions, each of said regions being assigned with a respective highest MODCOD (HMC) for use in said region and a respective derived MODCOD (DMC) to provide a required availability for said region, said HMCs and DMCs being members of said set, and wherein said subset comprises said respectively assigned HMCs and DMCs; and a controller associated with said MODCOD limiter, configured to select MODCODs for data transmission from said subset in accordance with measurements fed via return links.

2. The satellite broadcasting system of claim 1, wherein the MODCODS of said set range from a minimal configuration to a maximal configuration and wherein said MODCOD limiter is configured to include said MODCOD having a minimal configuration in said subset.

3. The satellite broadcasting system of claim 1, further comprising a utilization unit associated with said MODCOD limiter, configured to direct said MODCOD limiter to retain MODCODS with a higher utilization and discard MODCODS with a lower utilization.

4. The satellite broadcasting system of claim 3, wherein said MODCOD limiter is configured to modify utilization thresholds of respectively retained MODCODS.

5. The satellite broadcasting system of claim 1, wherein said MODCOD limiter is configured to retain and discard MODCODS per region.

6. The satellite broadcasting system of claim 1, further comprising a utilization unit associated with said MODCOD limiter configured to direct said MODCOD limiter to retain MODCODS with a higher utilization and discard MODCODS with a lower utilization, wherein said utilizations are per region.

7. The satellite broadcasting system of claim 1, wherein the MODCODS range between a minimal configuration and a maximal configuration, said MODCOD limiter being configured to provide each region with the minimal configuration MODCOD irrespective of utilization and at least one other MODCOD based on respectively higher utilization.

8. The satellite broadcasting system of claim 1, further comprising a utilization unit associated with said MODCOD limiter configured to determine overall utilization levels of MODCODs over all regions and replacing MODCODS of low overall utilization with a nearest lower configuration MODCOD of higher utilization.

9. A satellite broadcasting method for communication between a satellite hub and a range of ground stations in which a set having a predetermined number of MODCODS is available for data transmission from the satellite hub to the ground stations, each MODCOD requiring resources, the method comprising:
limiting the number of MODCODs in operation at a given time to a subset smaller than said predetermined number of MODCODS by:
partitioning said ground stations into regions;
respectively assigning to each of said regions at least two MODCODs from said set, wherein for each region said at least two MODCODs comprise a respective highest MODCOD (HMC) for use in said region and a respective derived MODCOD (DMC) to provide a required availability for said region; and
retaining said respectively assigned MODCODs as said subset; and
selecting MODCODs for data transmission from said subset in accordance with measurements fed via return links.

10. The satellite broadcasting method of claim 9, wherein the MODCODS range from a minimal configuration to a maximal configuration, the method comprising including a MODCOD having a minimal configuration in said subset.

11. The satellite broadcasting method of claim 9, comprising identifying respective utilization levels of MODCODS of members of said subset, and retaining MODCODS with a higher utilization and discarding MODCODS with a lower utilization.

12. The satellite broadcasting method of claim 9, the method comprising discarding MODCODS per region.

13. The satellite broadcasting method of claim 1, further comprising directing said MODCOD limiter to retain MODCODS with a higher utilization and discard MODCODS with a lower utilization, wherein said utilizations are per region.

14. The satellite broadcasting method of claim 13, comprising providing each region with the minimal configuration MODCOD irrespective of utilization and at least one other MODCOD based on respectively higher utilization.

15. The satellite broadcasting method of claim 9, comprising providing an interactive television channel.

16. The satellite broadcasting method of claim 9, wherein the MODCODS range between a minimal configuration and a maximal configuration, and wherein said ground stations are divided into regions, the method comprising:
assigning a first MODCOD of minimal configuration to all regions;
assigning to each region a second MODCOD corresponding to ideal conditions for said region; and
assigning to each region a further MODCOD with a configuration lying between those of said first and said second MODCODs,
including all of said assigned MODCODs in said subset.

17. The satellite broadcasting method of claim 16, further comprising determining respective overall utilization levels of MODCODs of said subset over all regions, and replacing MODCODS of low overall utilization with a nearest lower configuration MODCOD of higher utilization.

18. The satellite broadcasting system of claim 1, wherein a number of MODCODs respectively assigned to each of said regions equals two.

19. The satellite broadcasting system of claim 1, wherein said MODCOD limiter is configured to further limit a number of instantaneously operational MODCODs over all of said regions by weighing each of said assigned MODCODs by a respective activity factor and respective traffic fraction, removing a low weight MODCOD, and using a lower MODCOD for traffic requiring said removed MODCOD.

* * * * *